United States Patent
Saito et al.

(10) Patent No.: US 8,625,573 B2
(45) Date of Patent: Jan. 7, 2014

(54) COMMUNICATION DEVICE, BASE STATION, COMMUNICATION SYSTEM, AND COMMUNICATION METHOD

(75) Inventors: Yoshiko Saito, Kanagawa (JP); Ayako Horiuchi, Kanagawa (JP); Seigo Nakao, Kanagawa (JP); Kenichi Miyoshi, Kanagawa (JP); Megumi Ichikawa, legal representative, Kanagawa (JP); Katsuhiko Hiramatsu, Kanagawa (JP); Yuichi Kobayakawa, California, CA (US)

(73) Assignee: Panasonic Corporation, Osaka (JP)

( * ) Notice: Subject to any disclaimer, the term of this patent is extended or adjusted under 35 U.S.C. 154(b) by 413 days.

(21) Appl. No.: 12/921,549

(22) PCT Filed: Mar. 12, 2009

(86) PCT No.: PCT/JP2009/001119
§ 371 (c)(1),
(2), (4) Date: Jan. 4, 2011

(87) PCT Pub. No.: WO2009/113313
PCT Pub. Date: Sep. 17, 2009

(65) Prior Publication Data
US 2011/0096761 A1     Apr. 28, 2011

(30) Foreign Application Priority Data

Mar. 12, 2008 (JP) .................................. 2008-063111

(51) Int. Cl.
*H04L 12/28* (2006.01)
(52) U.S. Cl.
USPC ....................................................... 370/351

(58) Field of Classification Search
USPC ................ 370/351, 389, 395.1, 395.2, 395.4, 370/395.41, 395.21, 464, 465, 468; 379/111, 114.01, 114.06, 114.07; 455/403, 422.1, 450, 452.1, 452.2
See application file for complete search history.

(56) References Cited

U.S. PATENT DOCUMENTS 5,479,404 A * 12/1995 Francois et al. ............... 370/468
5,651,007 A * 7/1997 Warren et al. ................. 370/431
(Continued)

FOREIGN PATENT DOCUMENTS

JP    2003-532334    10/2003
JP    2007-116696     5/2007
(Continued)

OTHER PUBLICATIONS

International Search Report dated Jun. 16, 2009.

*Primary Examiner* — Fan Ng
(74) *Attorney, Agent, or Firm* — Dickinson Wright PLLC

(57) ABSTRACT

There are provided a communication device, a base station, a communication system, and a communication method that make it possible to yield a diversity effect by cooperative relay without involvement of disproportionateness in data received by an eNB even when one of parties has unsuccessfully exchanged data. After received an ACK signal from a repeater 1, a repeater 2 which has transmitted a NACK signal in procedure 7 transmits data S2 to the eNB by use of its own resource, thereby making its own resource available for the repeater 1 (the repeater 2 does not use its own resource, and the repeater 1 uses the resource of the repeater 2). In procedures 8, the repeater 1 has received the NACK signal from the repeater 2 and subsequently transmits data S1 to the eNB by use of its own resource. Subsequently, the repeater 1 which has received the MACK signal in procedure 9 determines that the resource of the repeater 2 is available and transmits data P1 to the eNB by use of the resource of the repeater 2. In procedure 10, the repeater 1 transmits previously-generated data P2 to the eNB by use of its own resource.

12 Claims, 13 Drawing Sheets

(56) References Cited

U.S. PATENT DOCUMENTS

| | | | |
|---|---|---|---|
| 6,721,332 B1* | 4/2004 | McAlear | 370/466 |
| 8,213,396 B1* | 7/2012 | Oroskar et al. | 370/338 |
| 2002/0006159 A1 | 1/2002 | Wagner | |
| 2003/0148732 A1* | 8/2003 | Hunter et al. | 455/10 |
| 2007/0086388 A1 | 4/2007 | Kang | |
| 2009/0130975 A1 | 5/2009 | Horiuchi | |
| 2009/0175225 A1* | 7/2009 | Bi et al. | 370/329 |

FOREIGN PATENT DOCUMENTS

| | | |
|---|---|---|
| JP | 2008-48218 | 2/2008 |
| WO | 2007/114287 | 10/2007 |

\* cited by examiner

FIG.9
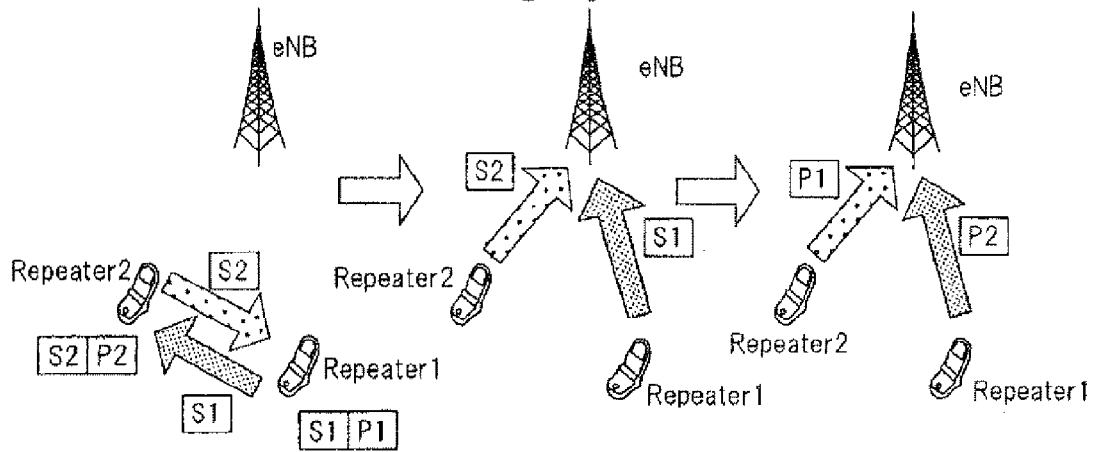
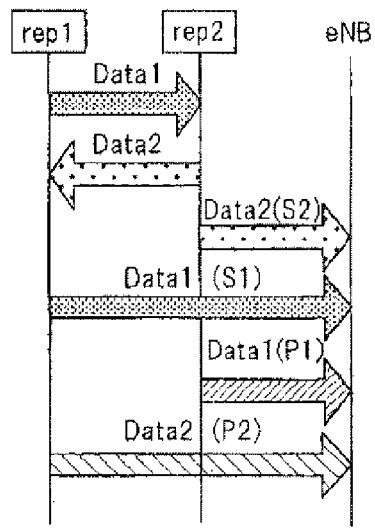
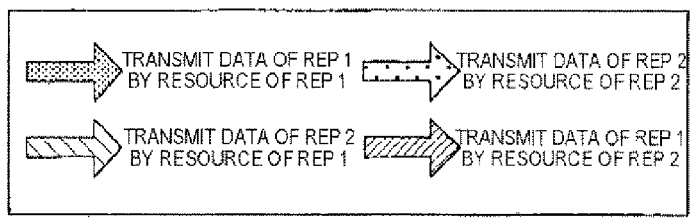

FIG.10
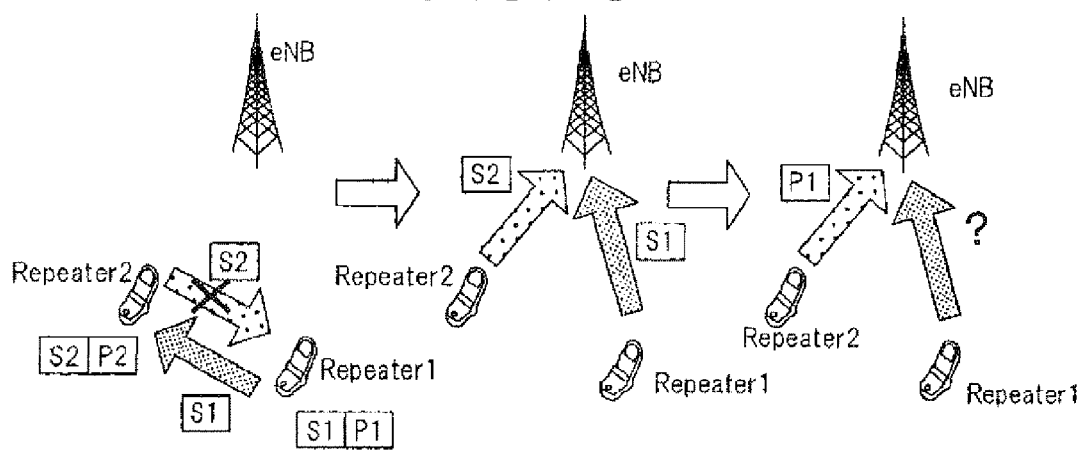
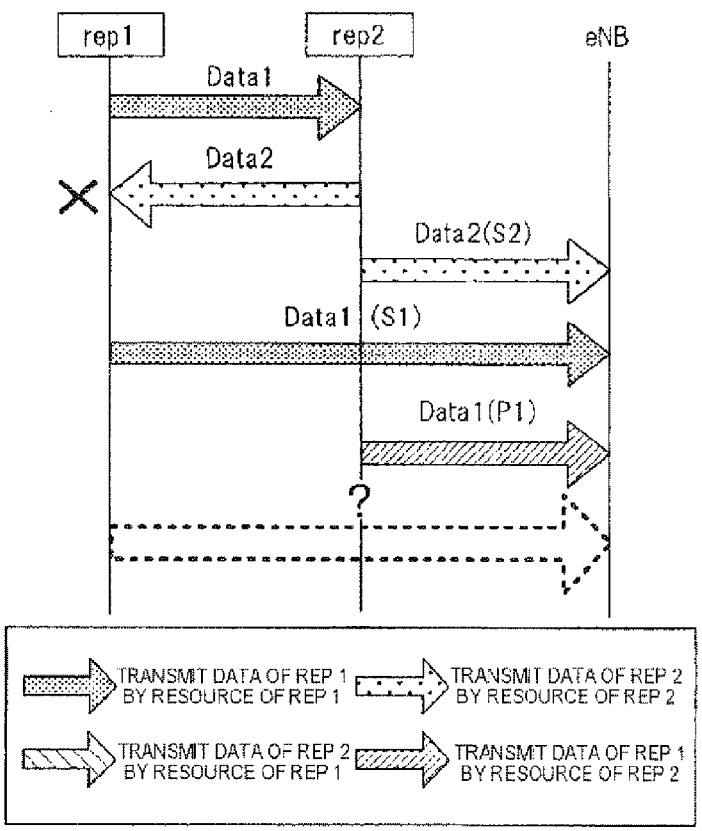

FIG.11
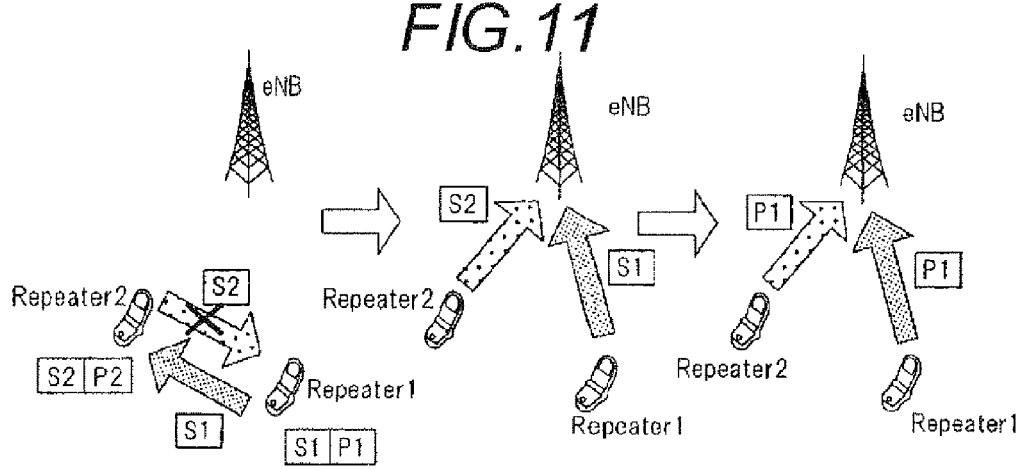
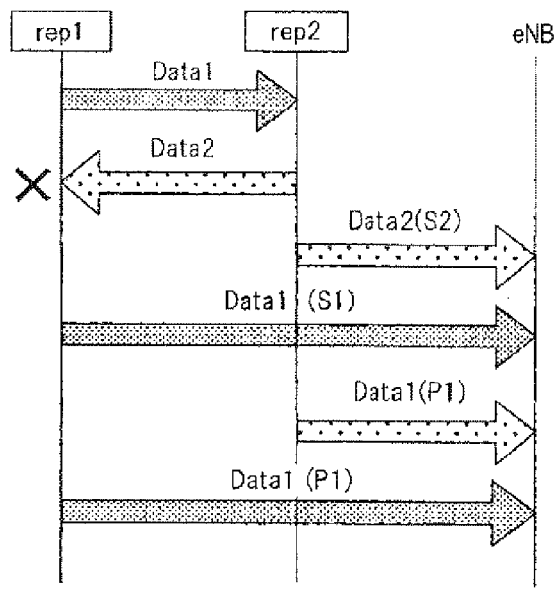
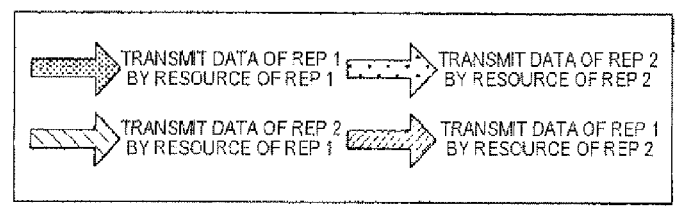

COMMUNICATION DEVICE, BASE STATION, COMMUNICATION SYSTEM, AND COMMUNICATION METHOD

TECHNICAL FIELD

The present invention relates to a communication device, a base station, a communication system, and a communication method for performing cooperative relay (coded cooperation).

BACKGROUND ART

In relation to a radio communication system including a radio base station unit (eNB) and a plurality of terminals each of which has a repeating function (hereinafter called simply "repeaters"), there has already been proposed cooperative relay called Coded Cooperation in order to yield a receiving diversity effect at the eNB. Coded cooperation is a relaying scheme by means of which information that respective repeaters desire to transmit are exchanged and by means of which information that a repeater of interest and another repeater desire to transmit is also transmitted to the eNB. The Coded Cooperation is hereinbelow referred to simply as "cooperative relay."

FIG. 9 shows example operation (a successful example) of cooperative relay. Descriptions are provided while attention is paid to operation of Repeater 1 (hereinafter described as a "repeater 1") in FIG. 9. The repeater 1 divides data into first transmission data S1 including systematic bits and parity data P1 including parity bits; transmits the first transmission data S1 to Repeater 2 (hereinafter described as a "repeater 2"); and receives first transmission data S2 from the repeater 2.

The repeater 1 generates parity data P2 from the received first transmission data S2. Subsequently, the repeater 1 transmits the first transmission data S1 of itself to the eNB and subsequently transmits the generated parity data P2 to the eNB.

Likewise, operation of the repeaters 2 is described. The repeater 2 divides data into the first transmission data S2 including systematic bits and parity data P2 including parity bits; transmits the first transmission data S2 to the repeater 1; and receives the first transmission data S1 from the repeater 1.

The repeater 2 generates the parity data P1 from the received first transmission data S1. Subsequently, the repeater 2 transmits first transmission data S2 of itself to the eNB and subsequently transmits the generated parity data P1 to the eNB.

In doing so, the eNB receives data, which are divided into two blocks, from each of the respective repeaters by way of respective different paths (cooperative relay is performed), so that a diversity effective can be yielded. Moreover, in a case where a level of one path remains low for a long period of time for reasons of fading of a long period (slow fading), it becomes possible to avoid occurrence of a situation in which receiving operation becomes impossible.

However, as can be seen from (unsuccessful) example operation of cooperative relay shown in FIG. 10, there has been a problem of, when one repeater or both repeaters are unsuccessful at exchanging data between the repeaters (occurrence of CRC NG, or the like), data to be transmitted after transmission of first transmission data from a repeater of interest becoming extinct.

There are available the following two simple countermeasures against a case where exchange of data between repeaters is unsuccessful.

(1) Transmit parity data of itself (see; for instance, Patent Document 1)

(2) Introduce an ACK signal and an NACK signal.

Patent Document 1: US 2003/0148732 A

DISCLOSURE OF THE INVENTION

Problem that the Invention is to Solve (1) A Case where Parity Data of Itself are Transmitted A repeater which has unsuccessfully exchanged data (received data exhibited CRC NG, or the like) transmits parity data of itself after transmission of its first transmission data.

Operation of cooperative relay is described by means of taking FIG. 11 by way of example. First, respective repeaters exchange their first transmission data. When the repeater 1 is unsuccessful in receipt of first transmission data S2 and when the repeater 2 is successful in receipt of first transmission data S1, the respective repeaters transmit their first transmission data to an eNB. Subsequently, the repeater 1 transmits its parity data P1 to the eNB, and the repeater 2 transmits the party's parity data P1 to the eNB.

In doing so, even when exchange of data between the repeaters is unsuccessful, data to be transmitted are determined. However, if one of the repeaters has been unsuccessful in exchange of data, received data in the eNB become disproportionate. In the example shown in FIG. 11, disproportionateness; namely, receipt of a larger volume of data from the repeater 1, occurs in the eNB.

Four cases are conceivable according to whether or not exchange of data is successful. Respective processing flows are shown in FIG. 12. Case 1 shows that both the repeater 1 and the repeater 2 are successful in receipt of data; Case 2 shows that the repeater 1 is successful in receipt of data but the repeater 2 is unsuccessful in receipt of data; Case 3 shows that the repeater 1 is unsuccessful in receipt of data but the repeater 2 is successful in receipt of data; and Case 4 shows that both the repeater 1 and the repeater 2 are unsuccessful in receipt of data.

(2) A Case where an ACK Signal/a NACK Signal are Introduced

An ACK signal showing successful exchange of data and a NACK signal showing unsuccessful exchange of data are introduced. A repeater which has transmitted a NACK signal transmits its parity data after transmitted its first transmission data. Likewise, a repeater which has received a NACK signal transmits its parity data after transmitted its first transmission data.

Operation of cooperative relay is described by means of taking FIG. 13 by way of example. First, respective repeaters exchange their first transmission data. When the repeater 1 is unsuccessful in receipt of the first transmission data S2 and when the repeater 2 is successful in receipt of the first transmission data S1, the repeater 1 transmits a NACK signal to the repeater 2, and the repeater 2 transmits an ACK signal to the repeater 1. The respective repeaters first transmit their first transmission data to the eNB and subsequently transmit their parity data to the eNB.

In doing so, even when exchange of data between the repeaters is unsuccessful, data to be transmitted is determined. On the contrary, even when one of the repeaters has been unsuccessful at exchanging data, disproportionateness in data received by the eNB is resolved. However, in this case, there arises a problem of both repeaters becoming unable to implement cooperative relay.

As mentioned above, even when consideration is given to a case where exchange of data between repeaters has become unsuccessful, the related art still encounters a problem of disproportionateness occurring in the data received by the eNB when one of the repeaters is unsuccessful at exchange data; namely, a problem of a diversity effect by cooperative relay being not yielded.

The present invention has been conceived in light of the circumstance and aims at providing a communication device, a base station, a communication system, and a communication method that make it possible to yield a diversity effect by cooperative relay without involvement of occurrence of disproportionateness in the data received by the eNB even when one of communication devices is unsuccessful at exchanging data.

Means for Solving the Problem

A technical point of the present invention lies in that resources are shared between repeaters which perform cooperative relay and that a repeater which has unsuccessfully exchanged data, between the repeaters transmits its first data and subsequently opens its own resource to a party repeater (i.e., the unsuccessful repeater does not use its own resource and makes it possible for the partner repeater to use the resource). As a result, the eNB can yield a diversity effect by cooperative relay without involvement of disproportionateness in received data.

Specifically, (1) The eNB provides repeaters which perform cooperative relay with a direction for allocating resources. On this occasion, the resources to be allocated are made sharable between the repeaters.

(2) The repeaters exchange data with each other.

(3) The respective repeaters transmit data commensurate with a result of exchange of data to the eNB. The repeater which has unsuccessfully exchanged data opens its own resource to a party repeater at the next timing.

Namely, the present invention provides a communication device that shares resources allocated by a base station with another communication device, the communication device comprising: a transmission block for transmitting data; and a receiving block for receiving data, wherein according to whether or not the communication device has successfully received the data transmitted from the other communication device and whether or not the other communication device has successfully received the data from the communication device, data to be transmitted at next transmission timing by the communication device and which one of the resource allocated to the communication device and the resource allocated to the other communication device is used for transmission are determined.

According to the configuration, when a communication device and another communication device perform cooperative relay by exchanging data with each other, transmission data and resources used for transmission are determined according to a result of exchange of data. Even when one of the communication devices has unsuccessfully exchanged data, the base station can yield a diversity effect by cooperative relay without involvement of disproportionateness in received data.

Further, the present invention provides the communication device, wherein there are performed dividing data of the communication device into data S1 and data P1, transmitting the data S1 to the other communication device and the base station by use of a first resource, and receiving data S2 transmitted from the other communication device by use of a second resource, and the communication device further includes: an ACK/NACK signal generation block that is adapted to generate, according to a result of channel decoding of the data S2, an ACK signal when receipt of the data S2 is successful and generates a NACK signal when receipt of the data S2 is unsuccessful; a parity bit generation block that is adapted to generate data P2 from the data S2 when a result of channel decoding of the data S2 shows successful receipt; and a transmission mode generation block that is adapted, when the ACK/NACK signal generation block has generated the NACK signal and when the ACK signal is received from the other communication device, to transmit the data S1 by use of the first resource and performs control operation such that transmission of the first resource is not performed, from then on, before completion of cooperative relay of transmission data of one block.

By means of the configuration, when the communication device has unsuccessfully received the data S2, the other communication device transmits the data P2 to the base station by use of the first resource. Hence, even when one of the communication devices has unsuccessfully exchanged data the base station can yield a diversity effect by cooperative relay without involvement of disproportionateness in received data. The essential requirement for the relationship between the data S1 and the data P1 or the relationship between the data S2 and the data P2 is that two blocks of data can be decoded when they become equal to each other, like a relationship between; for instance, systematic bits and parity bits.

The present invention provides the communication device, wherein there are performed dividing data of the communication device into data S1 and data P1, transmitting the data S1 to the other communication device and the base station by use of a first resource, and receiving data S2 transmitted from the other communication device by use of a second resource, and the communication device further includes: an ACK/NACK signal generation block that is adapted to generate, according to a result of channel decoding of the data S2, data P2 from the data S2 and an ACK signal when receipt of the data S2 is successful and generates a NACK signal when receipt of the data S2 is unsuccessful; and a transmission mode generation block that is adapted, when the ACK/NACK signal generation block has generated the ACK signal and when the NACK signal is received from the other communication device, to transmit the data S1 and the data P2 by use of the first resource and performs control operation such that the data P1 are transmitted by means of the second resource.

The present invention provides the communication device, wherein there are performed dividing data of the communication device into data S1 and data P1, transmitting the data S1 to the other communication device and the base station by use of a first resource, and receiving data S2 transmitted from the other communication device by use of a second resource, and the communication device further includes:

an ACK/NACK signal generation block that is adapted to generate, according to a result of channel decoding of the data S2, an ACK signal when receipt of the data is successful and to generate a NACK signal when receipt of the data is unsuccessful; and a transmission mode generation block that is adapted to perform control operation such that, when the ACK/NACK signal generation block generates the NACK signal and when the NACK signal is received from the other communication device, the data S1 are transmitted by means of the first resource and, from then on, the data P1 are transmitted by the second resource.

The present invention provides a base station comprising: a section of allocating a first resource and a second resource respectively to a first communication device that transmits data S1 and data P1 and a second communication device that transmits data S2 and data P2 when the first communication device and the second communication device perform cooperative relay; a section of receiving the data S1 and the data P2 transmitted by means of the first resource; and a section of receiving the data S2 and the data P1 transmitted by means of the second resource.

The present invention provides a communication system that includes a first communication device that transmits data S1 and data P1, a second communication device that transmits data S2 and data P2, and a base station, the first communication device and the second communication device performing cooperative relay, wherein the base station allocates a first resource and a second resource to the first and second communication devices, respectively; the first communication device transmits the data S1 to the second communication device and the base station by means of the first resource and transmits to the base station by means of the first resource the data P2 that have been generated by receipt of the data S2 transmitted from the second communication device by means of the second resource; and the first communication device transmits the data P1 to the base station by means of the second resource when the second communication device has unsuccessfully received the data S1 transmitted from the first communication device by means of the first resource.

The present invention provides a communication method that includes a first communication device that transmits data S1 and data P1, a second communication device that transmits data S2 and data P2, and a base station, the first communication device and the second communication device performing cooperative relay, the method comprising: a step in which the base station allocates a first resource and a second resource to the first and second communication devices, respectively; a step in which the first communication device transmits the data S1 to the second communication device and the base station by means of the first resource and transmits to the base station by means of the first resource the data P2 that have been generated by receipt of the data S2 transmitted from the second communication device by means of the second resource; and a step in which the first communication device transmits the data P1 to the base station by means of the second resource when the second communication device has unsuccessfully received the data S1 transmitted from the first communication device by means of the first resource.

The present invention provides the communication device, wherein there are performed dividing data of the communication device into data S1 and data P1, transmitting the data S1 to the other communication device by means of a first resource, and transmitting the data P1 to the base station, and the communication device further includes: a correlative operation block which is adapted to subject the data S1 of the communication device and data first transmitted from the other communication device to the base station to self-correlation operation and to determine that the other communication device has successfully received the data S1 when a high correlation exists and that the other communication device has unsuccessfully received the data S1 when a low correlation exits; and a resource control block which is adapted to perform control operation, when the correlative operation block determines that the other communication device has successfully received the data S1 and that the communication device has successfully received data S2 from the other communication device, such that the data S2 and the data S1 are transmitted to the base station by means of the first resource and that the data P1 are transmitted to the base station by means of the second resource.

By means of the configuration, when the communication device has successfully received the data S2 and when the other communication device has unsuccessfully received the data S1, control operation is performed such that the data P1 are transmitted to the base station by use of the second resource. Hence, it is possible to yield a diversity effect by cooperative relay without involvement of disproportionateness in data received by the base station. The number of ACK and NACK signals can be reduced.

The present invention provides the communication device, wherein there are performed dividing data of the communication device into data S1 and data P1, transmitting the data S1 to the other communication device by means of a first resource, and transmitting the data P1 to the base station, and the communication device further includes: a correlative operation block which is adapted to subject the data S1 of the communication device and data first transmitted from the other communication device to the base station to self-correlation operation and to determine that the other communication device has successfully received the data S1 when a high correlation exists and that the other communication device has unsuccessfully received the data S1 when a low correlation exits; and a resource control block which is adapted to perform control operation, when the correlative operation block determines that the other communication device has successfully received the data S1 and that the communication device has unsuccessfully received data S2 from the other communication device, such that the data P1 are transmitted to the base station by means of the first resource and that transmission is stopped from then on before completion of cooperation relay of transmission data of one block.

The present invention provides the communication device, wherein there are performed dividing data of the communication device into data S1 and data P1, transmitting the data S1 to the other communication device by means of a first resource, and transmitting the data P1 to the base station, and the communication device further includes: a correlative operation block which is adapted to subject the data S1 of the communication device and data first transmitted from the other communication device to the base station to self-correlation operation and to determine that the other communication device has successfully received the data S1 when a high correlation exists and that the other communication device has unsuccessfully received the data S1 when a low correlation exits; and a resource control block which is adapted to perform control operation, when the correlative operation block determines that the other communication device has unsuccessfully received the data S1 and that the communication device has also unsuccessfully received data S2 from the other communication device, such that the data S1 are transmitted to the base station by means of a second resource.

The present invention provides a base station comprising: a section of allocating a first resource and a second resource respectively to a first communication device that transmits data S1 and data P1 and a second communication device that transmits data S2 and data P2 when the first communication device and the second communication device perform cooperative relay; a section of receiving the data S1 and the data S2 transmitted by means of the first resource; and a section of receiving the data P1 and the data P2 transmitted by means of the second resource.

The present invention provides a base station comprising: a section of allocating a first resource and a second resource respectively to a first communication device that transmits data S1 and data P1 and a second communication device that transmits data S2 and data P2 when the first communication device and the second communication device perform cooperative relay; a section of receiving the data P1 and the data P2 transmitted by means of the first resource; and a section of receiving the data S1 and the data S2 transmitted by means of the second resource.

The present invention provides a base station comprising: a section of allocating a first resource and a second resource respectively to a first communication device that transmits data S1 and data P1 and a second communication device that transmits data S2 and data P2 when the first communication device and the second communication device perform cooperative relay; a section of receiving the data P1 and the data S2 transmitted by means of the first resource; and a section of receiving the data S1 and the data P2 transmitted by means of the second resource.

The present invention provides a communication system that includes a first communication device that has data S1 and data P1, a second communication device that has data S2 and data P2, and a base station that allocates first and second resources respectively to the first communication device and the second communication device, the first communication device and the second communication device performing cooperative relay, wherein when the second communication device has unsuccessfully received the data S1 transmitted from the first communication device and when the first communication device has successfully received the data S2 transmitted from the second communication device, the first communication device transmits the data P1 to the base station by means of the second resource and transmits the data S2 and the data S1 to the base station by means of the first resource.

The present invention provides a communication system that includes a first communication device that hats data S1 and data P1, a second communication device that has data S2 and data P2, and a base station that allocates first and second resources respectively to the first communication device and the second communication device, the first communication device and the second communication device performing cooperative relay, wherein the first communication device transmits the data S1 to the second communication device; the second communication device transmits the data S2 to the first communication device; and when the second communication device has unsuccessfully received the data S1 transmitted from the first communication device and when the first communication device has successfully received the data S2 transmitted from the second communication device, the first communication device transmits the data P1 to the base station by means of the second resource and transmits the data S2 and the data S1 to the base station by means of the first resource.

Advantageous Effect of the Invention

A communication device, a base station, a communication system, and a communication method of the present invention make it possible to yield a diversity effect by cooperative relay without involvement of occurrence of disproportionateness in data received by a base station even when one of communication devices is unsuccessful at exchange data.

BRIEF DESCRIPTION OF THE DRAWINGS

FIG. 9 is a diagram showing (successful) example operation of Coded Cooperation performed under a related art communication method.

FIG. 10 is a diagram showing (unsuccessful) example operation of Coded Cooperation performed under the related art communication method.

FIG. 11 is a diagram showing example operation performed when a repeater that has ended in unsuccessful exchange of data under the related art communication method transmits its own parity bit.

Figure 1:
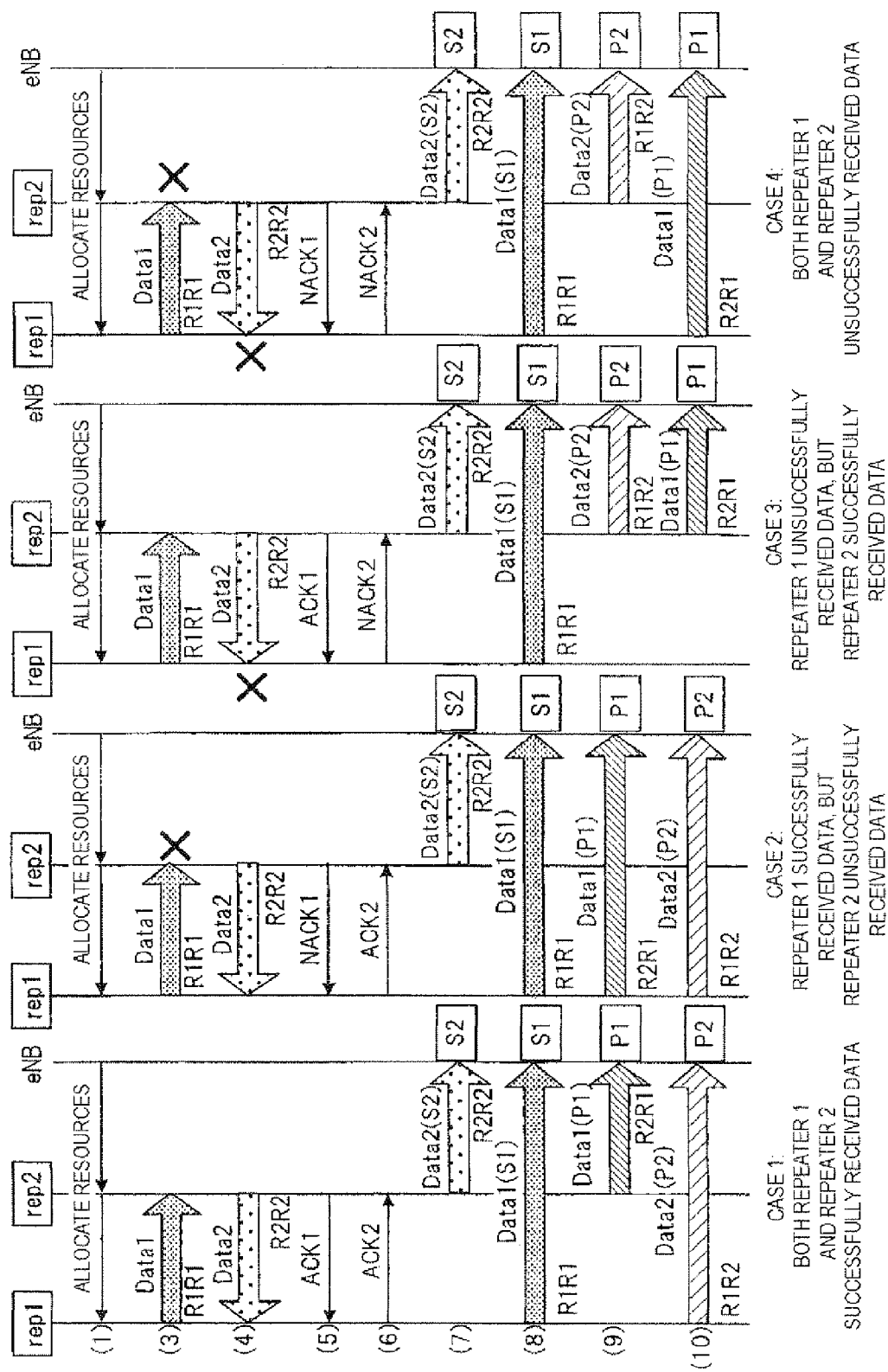
FIG. 1 is a sequence diagram of a communication method according to a first embodiment of the present invention.

DESCRIPTIONS OF THE REFERENCE NUMERALS AND SYMBOLS 11, 31 TRANSMISSION ANTENNA
12, 32 RECEIVING RF BLOCK
13, 33 A/D CONVERTER BLOCK
14, 21, 34, 39 BUFFER BLOCK
15, 35 DEMODULATION BLOCK
16, 36 CHANNEL DECODING BLOCK
17 RECEIVED DATA MEMORY
18 ACK/NACK SIGNAL GENERATION BLOCK
19, 37 TRANSMISSION RF BLOCK
20, 38 D/A CONVERTER BLOCK
22 TRANSMISSION DATA MEMORY
23, 40 MODULATION BLOCK
24, 41 CHANNEL ENCODING BLOCK
25 RESOURCE CONTROL BLOCK
26 TRANSMISSION POWER CONTROL BLOCK
27 TIMER
28 TRANSMISSION MODE GENERATION BLOCK
51 CORRELATIVE OPERATION BLOCK

BEST MODES FOR IMPLEMENTING THE INVENTION

Embodiments of the present invention are hereunder described by reference to the drawings.

First Embodiment

Figure 2:
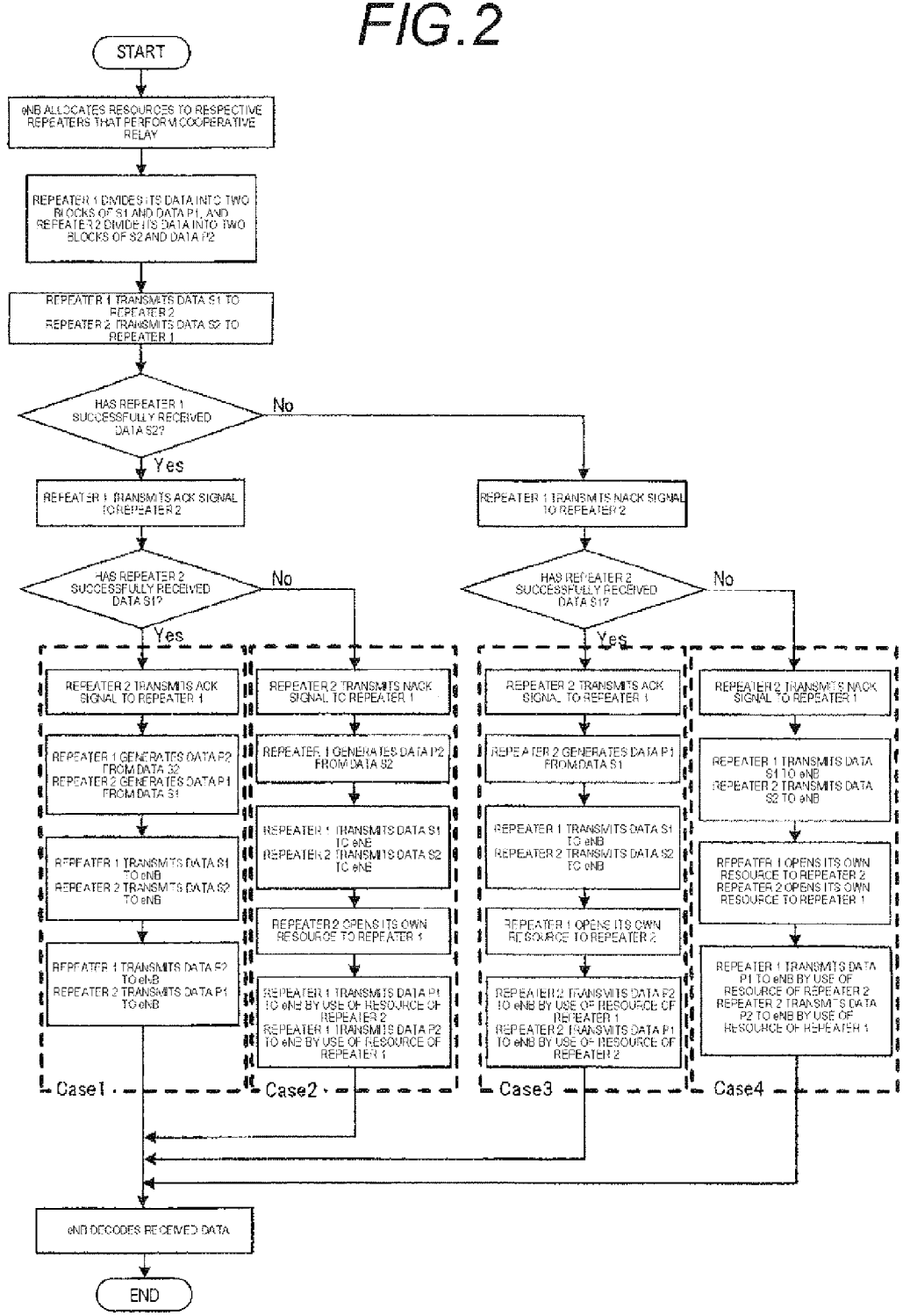
FIG. 2 is a flowchart of a communication method according to the first embodiment of the present invention.

FIG. 1 shows a sequence diagram according to a first embodiment, and FIG. 2 shows a flowchart of the first embodiment corresponding to FIG. 1. In the sequence diagram shown in FIG. 1, an arrow depicts a direction of transmission of data; reference symbol R1R1 designates a case where data pertaining to a repeater 1 are transmitted by means of a resource of the repeater 1; R1R2 designates a case where data pertaining to a repeater 2 are transmitted by means of a resource of the repeater 1; R2R2 designates a case where the data pertaining to the repeater 2 are transmitted by means of a resource of the repeater 2; and R2R1 designates a case where the data pertaining to the repeater 1 are transmitted by means of the resource of the repeater 2. Parenthesized numerals (1) and (3) to (10) shown in FIG. 1 correspond to procedure 1 and procedures 3 through 10, which will be described below. A procedure 2 is not illustrated in figure. Reference symbols Rep1 and Rep2 shown in FIG. 1 designate the repeater 1 and the repeater 2, respectively.

Embodiment

A Preceding Stage

Procedure 1: An eNB allocates resources to repeaters (a repeater 1 and a repeater 2) that perform cooperative relay. The resources are assumed to be sharable between the repeaters that perform cooperative relay.

Procedure 2: Each of the repeaters divides one block of data, which the repeater desires to transmit by means of cooperative relay, into two sub-blocks of data. In the present embodiment, an explanation is given to a case where data are separated into two sub-blocks; namely, first transmission data including systematic bits (denoted as Sx) and transmission data including parity bits (denoted as Px) (reference symbol "x" means a repeater number).

Procedure 3: The repeater 1 transmits its first transmission data S1 (Data 1) to the repeater 2 by use of its own resource.

Procedure 4: The repeater 2 transmits its first transmission data S2 (Data 2) to the repeater 1 by use of its own resource.

Embodiment

Main (Case 1: Both the Repeater 1 and the Repeater 2 are Successful in Receipt of Data)

Procedure 5: The repeater 2 transmits an ACK signal to the repeater 1 and generates parity bits P1 from the received data S1.

Procedure 6: The repeater 1 transmits an ACK signal to the repeater 2 and generates parity bits P2 from the received data S2.

Procedure 7: The repeater 2 transmits the first transmission data S2 to the eNB by use of its own resource after received an ACK signal from the repeater 1.

Procedure 8: The repeater 1 transmits the first transmission data S1 to the eNB by use of its own resource after received an ACK signal from the repeater 2.

Subsequently,

Procedure 9: The repeater 2 transmits the generated parity bits P1 to the eNB by use of its own resource.

Procedure 10: The repeater 1 transmits the generated parity bits P2 to the eNB by use of its own resource.

(Case 2: The Repeater 1 is Successful in Receipt of Data, but the Repeater 2 is Unsuccessful in Receipt of Data)

Procedure 5: The repeater 2 transmits the NACK signal to the repeater 1.

Procedure 6: The repeater 1 transmits the ACK signal to the repeater 2 and generates the parity bits P2 from the received first transmission data S2.

Procedure 7: After received the ACK signal from the repeater 1, the repeater 2 which has transmitted the NACK signal transmits the first transmission data S2 to the eNB by use of its own resource. From then on, the repeater 2 opens its own resource to the repeater E in other words, the repeater 2 does not use its own resource and makes its own resource available for the repeater 1.

Procedure 8: After received the NACK signal from the repeater 2, the repeater 1 transmits the first transmission data S1 to the eNB by use of its own resource.

Subsequently,

Procedure 9: The repeater 1 which has received the NACK signal determines that the resource of the repeater 2 is available and transmits the parity bits P1 to the eNB by use of the resource of the repeater 2.

Procedure 10: The repeater 1 further transmits the previously-generated parity bits P2 to the eNB by use of its own resource.

(Case 3: The Repeater 1 is Unsuccessful in Receipt of Data, and the Repeater 2 is Successful in Receipt of Data)

Procedure 5: The repeater 2 transmits an ACK signal to the repeater 1 and generates parity bits P1 from the received data S1.

Procedure 6: The repeater 1 transmits a NACK signal to the repeater 2.

Procedure 7: The repeater 2 transmits the first transmission data S2 to the eNB by use of its own resource after received the NACK signal from the repeater 1.

Procedure 8: The repeater 1 which has received the ACK signal transmits the first transmission data S1 to the eNB by use of its own resource after received the ACK signal from the repeater 2. From then on, the resource of the repeater 1 is opened for the repeater 2.

Subsequently,

Procedure 9: The repeater 2 which has received the NACK signal determines that the resource of the repeater 1 is available and transmits the parity bits P2 to the eNB by use of the resource of the repeater 1.

Procedure 10: The repeater 2 further transmits the previously-generated parity bits P1 to the eNB by use of its own resource.

(Case 4: Both the Repeater 1 and the Repeater 2 are Unsuccessful in Receipt of Data)

Procedure 5: The repeater 2 transmits a NACK signal to the repeater 1.

Procedure 6: The repeater 1 transmits a NACK signal to the repeater 2.

Procedure 7: The repeater 2 which has transmitted the NACK signal transmits the first transmission data S2 to the eNB by use of its own resource after received the NACK signal from the repeater 1. Subsequently, the resource of the repeater 2 is opened for the repeater 1.

Procedure 8: The repeater 1 which has transmitted the NACK signal transmits the first transmission data S1 to the eNB by use of its own resource after received the NACK signal from the repeater 2. From then on, the resource of the repeater 1 is opened for the repeater 2.

Subsequently,

Procedure 9: The repeater 2 which has received the NACK signal determines that the resource of the repeater 1 is available and transmits the parity bits P2 to the eNB by use of the resource of the repeater 1.

Procedure 10: Likewise, the repeater 1 which has received the NACK signal determines that the resource of the repeater 2 is available and transmits the parity bits P1 to the eNB by use of the resource of the repeater 2.

Embodiment

A Subsequent Stage

Procedure 11: The eNB decodes the received data.

Advantages of the Embodiment

By means of the procedures set forth, even when one of the repeaters has become unsuccessful in receipt of data at the time of exchange of data, the eNB can yield a diversity effect by cooperative relay without involvement of occurrence of disproportionateness in received data.

The above descriptions provide an example in which the repeater which has successfully received transmission data generates the parity bits P1 or P2 after transmission of the ACK signal in procedure 5 or 6 of Cases 1 through 3. However, timing at which the parity bits P1 or P2 is generated is not limited to the example. All you have to do is to generate the parity bits P1 or P2 at arbitrary timing after transmission of the ACK signals to the repeaters 1 and 2 in procedure 5 or 6 and before the parity bits P1 or P2 is transmitted in procedures 9 and 10.

Further, the data to be divided into two sub-blocks of data are not limited to the systematic bits and the parity bits that are described in connection with the present embodiment. For instance, the essential requirement for a relationship between the blocks of data is that one block of data should become redundant bits for the other block of data or data can equally be decoded when the blocks of data become equal to each other.

The number of sub-blocks into which data are to be divided is not limited to two. Further, the resource may be a time or a frequency. In the case of a time, transmission timings assigned to respective blocks of data come to be shared. In the case of a frequency, transmission frequencies assigned to respective blocks of data come to be shared.

Figure 3:
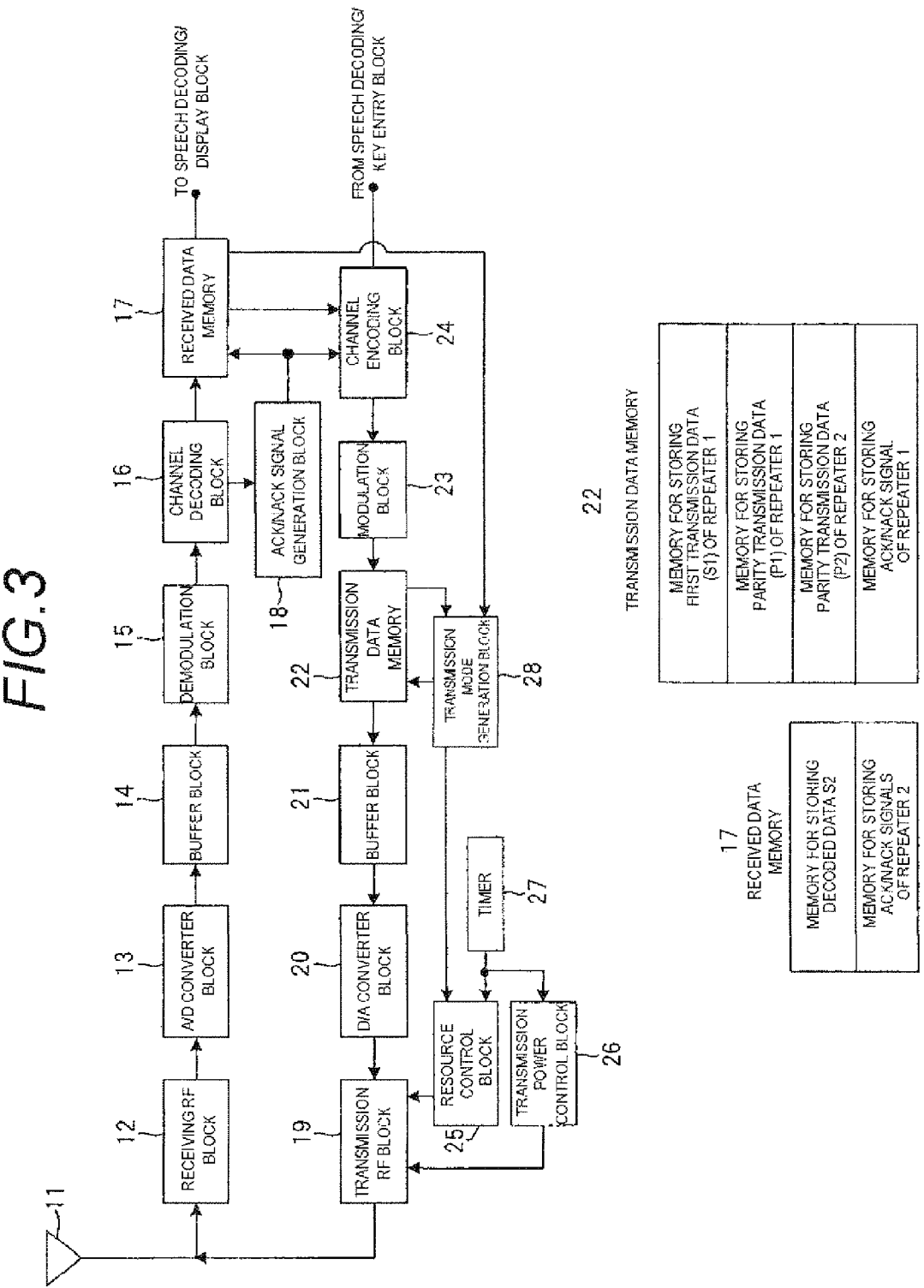
FIG. 3 is a block diagram of a repeater according to the first embodiment of the present invention.

A block diagram of the repeater and that of the base station are now described. FIG. 3 is a block diagram of the repeater. There is now described in detail operation of the repeater 1 performed before transmission of data pertaining to one block is completed by means of cooperative relay. A timing at which data pertaining to one of two blocks into which data have been divided are first transmitted to the eNB, is hereinbelow called a first frame. A timing at which the remaining block of the data is transmitted to the eNB is hereinafter called a second frame.

(Operation of the Repeater 1 for Transmitting the First Transmission Data S1 Performed at the Time of Exchange of Data)

A timer 27 outputs a signal showing whether the present time is a time for exchanging data or a time for normal transmission. A transmission power control block 26 performs control operation so as to weaken transmission power at the time of exchange of data by means of an output from the timer 27. Control information is output to a transmission RF block 19.

First, the repeater 1 divides its transmission data into "first transmission data" and "parity transmission data." The first transmission data are stored in "memory for storing first transmission data (S1) of the repeater 1," and the parity transmission data are stored in "memory for storing parity transmission data (P1) of the repeater 1" of transmission data memory 22. The repeater 1 reads the first transmission data from the transmission data memory 22 and stores the data in a buffer block 21. Subsequently, the data are subjected to D/A conversion in a D/A converter block 20. According to control information from the transmission power control block 26, the transmission RF block 19 up-converts the data into a signal of an RF range and transmits the signal from the transmission antenna 11.

<<S2 Receiving Operation of the Repeater 1 Performed at the Time of Exchange of Data>>

Subsequently, the receiving RF block 12 receives a first transmission signal (S2) from the repeater 2 by way of the antenna 11. The receiving RF block 12 converts the received signal to a baseband range through down-conversion, and the thus-converted signal is input to an A/D converter block 13. The signal input to the A/D converter block 13 is converted into a digital signal and subsequently stored in a buffer block 14. The signal stored in the buffer block 14 is demodulated in a demodulation block 15 and further subjected to channel decode processing in a channel decoding block 16. The signal is then held in "memory for storing decoded data S2" of received data memory 17. An ACK/NACK signal generation block 18 generates an ACK signal when receipt of the transmission signal is successful according to a result of channel decoding (CRC or the like) from the channel decoding block 16. When receipt of the transmission signal is unsuccessful, the ACK/NACK signal generation block generates a NACK signal. The thus-generated ACK/NACK signal undergoes channel encoding in a channel encoding block 24 and modulation processing in a modulation block 23, and a result of modulation is stored in "memory for storing an ACK/NACK signal of the repeater 1" of the transmission data memory 22. Moreover, the receipt of the signal S2 is successful (when an ACK signal is generated), decoded data S2 held in the "memory for storing decoded data S2" of the received data memory 17 are read. The channel encoding block 24 and the modulation block 23 generate parity bits P2 from the thus-read decoded data S2. The parity bits P2 is retained in "memory for storing parity transmission data (P2) of the repeater 2" of the transmission data memory 22.

<<Operation for Receiving an ACK/NACK Signal of the Repeater 1 at the Time of Exchange of Data>>

Subsequently, the receiving RF block 12 receives the ACK/NACK signal from the repeater 2 by way of the antenna 11. The receiving RF block 12 converts the received signal to the baseband range through down-conversion, and the thus-converted signal is input to the A/D converter block 13. The signal input to the A/D converter block 13 is converted into a digital signal, and the signal is stored in the buffer block 14. The signal stored in the buffer block 14 is demodulated by the demodulation block 15 and subjected to channel decoding in the channel decoding block 16. The thus-decoded signal is held in "memory for storing an ACK/NACK signal of the repeater 2" of the received data memory 17.

<<Operation for Transmitting an ACK/NACK Signal of the Repeater 1 at the Time of Exchange of Data>>

The ACK/NACK signal of the repeater 1 is read from the "memory for storing an ACK/NACK signal of the repeater 1" of the transmission data memory 22, and the thus-read signal is stored in the buffer block 21. The D/A converter block 21 subjects the signal stored in the buffer block 21 to D/A conversion, and the signal is further up-converted to a signal of an RF range by the transmission RF block 19. The signal is then transmitted from the transmission antenna 11.

<<Operation for Generation of Transmission Mode>>

(1) There is now described operation of a transmission mode generation block 28 performed when an "ACK signal" is in the "memory for storing an ACK/NACK signal of the repeater 2" of the received data memory 17 and when the "ACK signal" is in the "memory for storing an ACK/NACK signal of the repeater 1" of the transmission data memory 22.

The transmission mode generation block 28 generates a control signal for transmitting the first transmission data S1 at the first frame by use of its own resource and transmitting the parity data P2 at the second frame by use of its own resource, and outputs the control signal to the transmission data memory 22 and a resource control block 25. Information showing an address of data is notified to the transmission data memory 22 from the transmission mode generation block 28. The transmission mode generation block 28 notifies the resource control block 25 of information (available resource information) showing an available frequency (or a time slot).

(2) There is described operation of the transmission mode generation block 28 performed when the "NACK signal" is in the "memory for storing an ACK/NACK signal of the repeater 2" of the received data memory 17 and when the "ACK signal" is in the "memory for storing an ACK/NACK signal of the repeater 1" of the transmission data memory 22.

The transmission mode generation block 28 generates a control signal for transmitting the first transmission data S1 at the first frame by use of its own resource, transmitting the parity data P1 at the second frame by use of the resource of the party (the repeater 2), and subsequently transmitting the parity data P2 at the second frame by use of its own resource; and outputs the control signals to the transmission data memory 22 and the resource control block 25.

(3) There is described operation of the transmission mode generation block 28 performed when the "ACK signal" is in the "memory for storing an ACK/NACK signal of the repeater 2" of the received data memory 17 and when the "NACK signal" is in the "memory for storing an ACK/NACK signal of the repeater 1" of the transmission data memory 22.

The transmission mode generation block 28 generates a control signal for transmitting the first transmission data S1 at the first frame by use of its own resource and subsequently stopping transmission before completion of cooperative relay of transmission data of one block; and outputs the control signal to the transmission data memory 22 and the resource control block 25.

(4) There is described operation of the transmission mode generation block 28 performed when the "NACK signal" is in the "memory for storing an ACK/NACK signal of the repeater 2" of the received data memory 17 and when the "NACK signal" is in the "memory for storing an ACK/NACK signal of the repeater 1" of the transmission data memory 22.

The transmission mode generation block 28 generates a control signal for transmitting, at the first frame, the first transmission data S1 by use of its own resource and transmitting the parity data P1, at the second frame, by use of the resource of the party (the repeater 2); and outputs the control signals to the transmission data memory 22 and the resource control block 25.

<<Operation of the Repeater 1 for Transmission to the eNB>>

During normal transmission, the transmission power control block 26 performs control operation for setting transmission power to a normal value by means of an output from the timer 27. The control signal is output to the transmission RE block 19.

According to the control signal generated by the transmission mode generation block 28, the repeater 1 reads transmission data from the transmission data memory 22; stores the thus-read data in the buffer block 21; subjects the data to D/A conversion by means of the D/A converter block 20; converts the thus-converted data to an RF range through up-conversion by means of the transmission RF block 19; and transmits the signal from the transmission antenna 11.

The present embodiment has provided an explanation about a case where exchange of data between the repeaters is performed by use of the ordinary radio communication resources. However, exchange of data can likewise be implemented even in a case where a connection is made by means of a wire or infrared communication, or the like.

Figure 4:
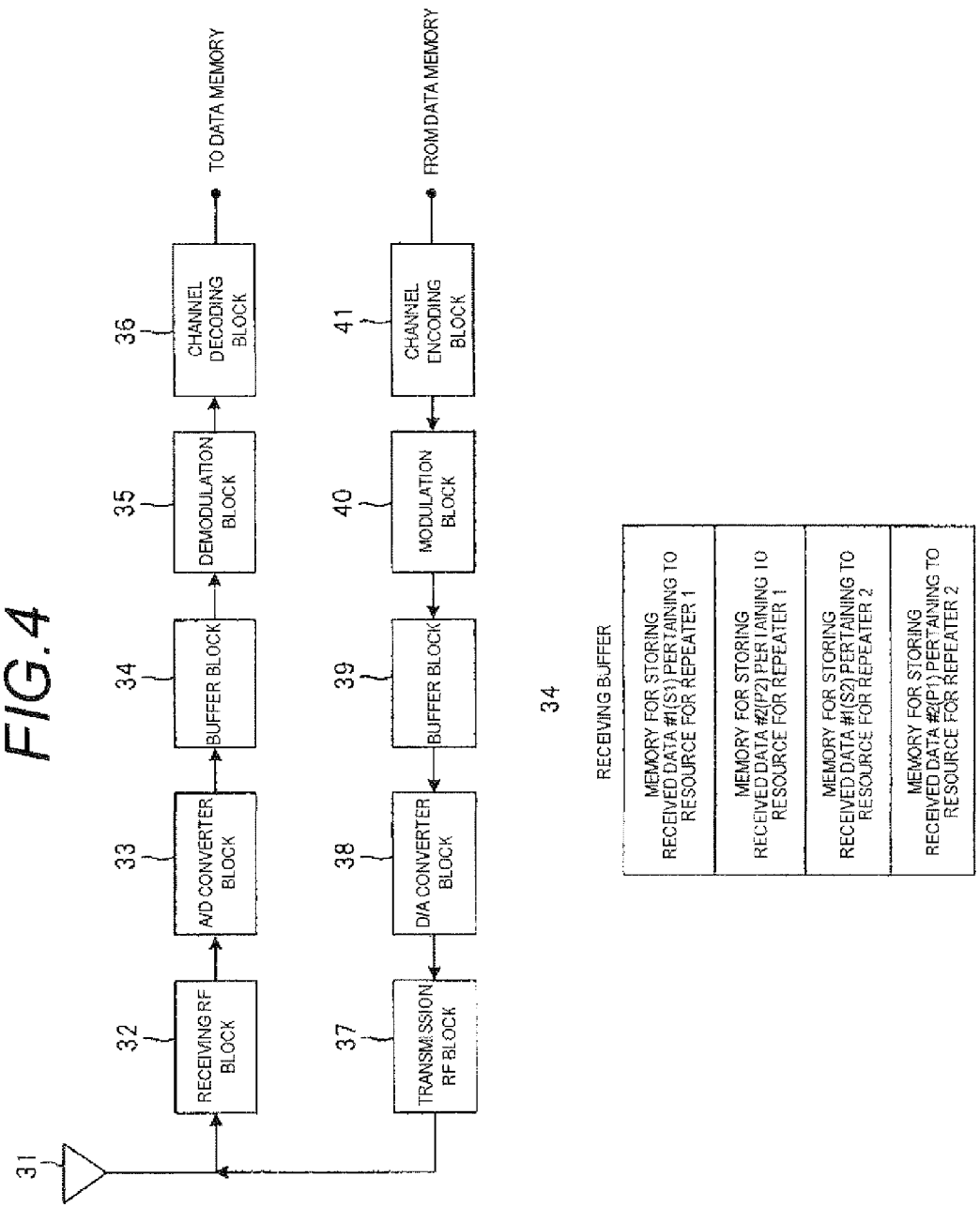
FIG. 4 is a block diagram of a base station according to the first embodiment and a second embodiment of the present invention.

FIG. 4 shows a block diagram of the base station. The base station receives a signal by way of an antenna 31 and by use of a receiving RF block 32. The receiving RF block 32 converts the received signal to the baseband range by means of down-conversion, and inputs the converted signal to an A/D converter block 33. The signal input to the A/D converter block 33 is converted into a digital signal and input to a buffer block 34. When the signal is stored to a predetermined volume of data (i.e., a total volume of data separately transmitted twice from the resource for the repeater 1 and data separately transmitted twice from the resource for the repeater 2) in the buffer block 34, a demodulation block 35 demodulates the data (the first transmission data S1 and the parity data P1) of the repeater 1 and the data (the first transmission data S2 and the parity data P2) of the repeater 2, and a channel decoding block 36 subjects the thus-decoded data to channel decoding.

(Advantage)

Even when one of the repeaters has become unsuccessful in receipt of the data at the time of exchange of data, the eNB can yield a diversity effect by cooperative relay without involvement of disproportionateness in received data.

Second Embodiment

The first embodiment provides explanations about the case where the ACK and MACK signals are used. A second embodiment; however, provides an example in which the present invention is implemented while the ACK and MACK signals are lessened.

Figure 5:
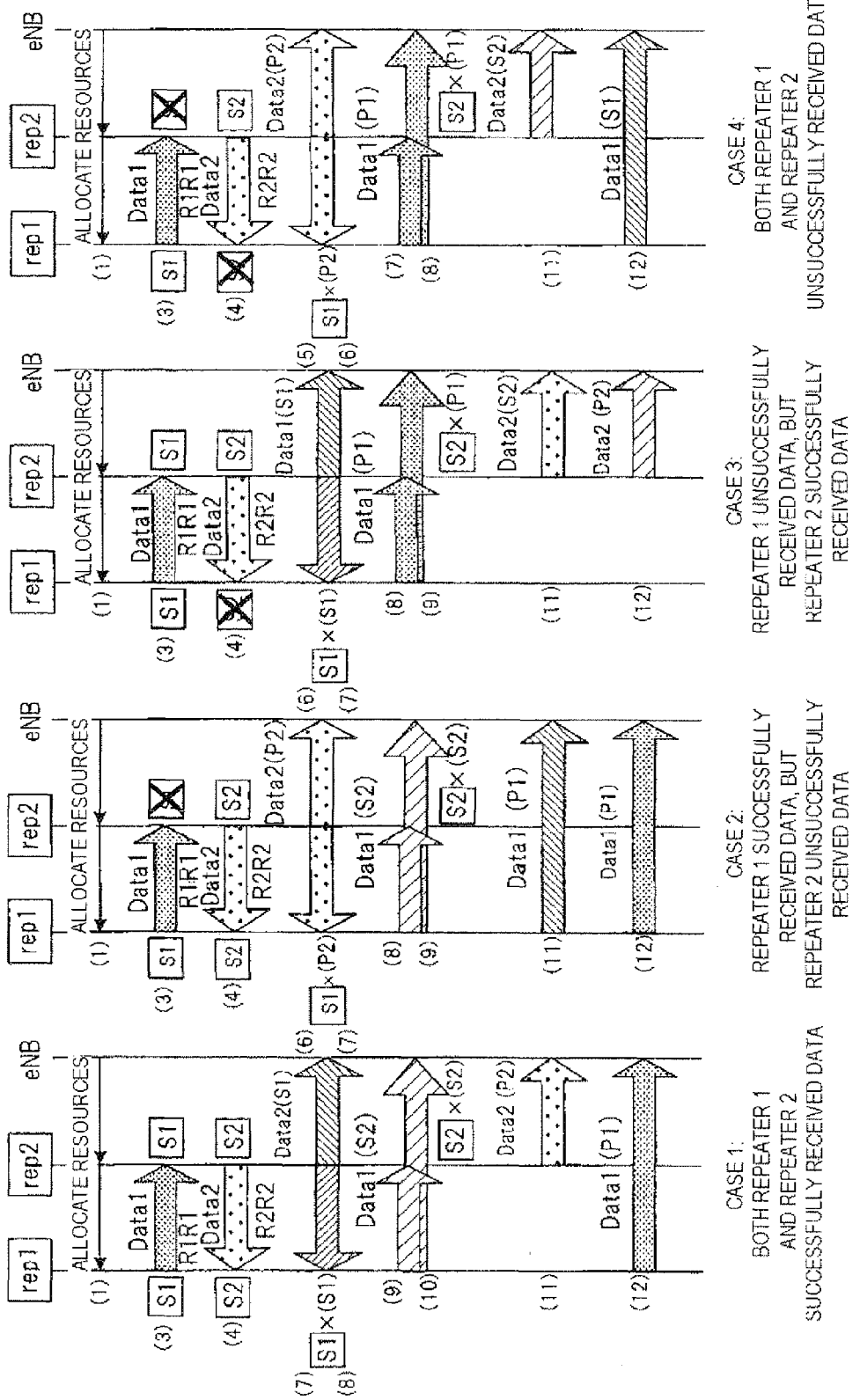
FIG. 5 is a sequence diagram of a communication method according to the second embodiment of the present invention.
Figure 6:
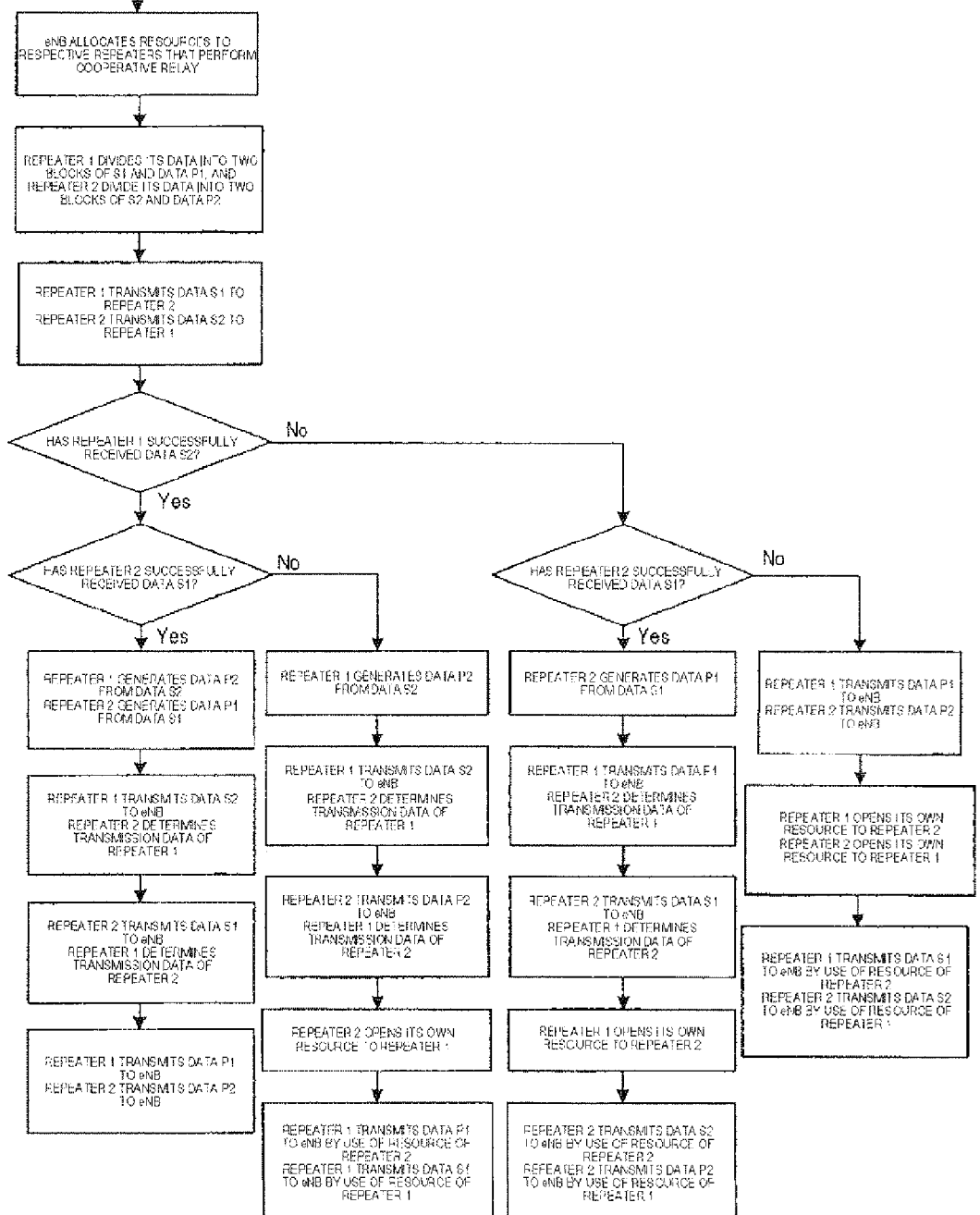
FIG. 6 is a flowchart of a communication method according to the second embodiment of the present invention.

FIG. 5 shows a sequence diagram according to the second embodiment, and FIG. 6 shows a flowchart according to the second embodiment corresponding to FIG. 5. A timing at which data pertaining to one of two blocks into which data have been divided are first transmitted to the eNB, is hereinbelow called a first frame. A timing at which the remaining block of the data is transmitted to the eNB is hereinafter called a second frame. Parenthesized numerals (1) to (12) shown in FIG. 5 correspond to procedures 1 through 12, which will be described below. Some reference procedures, like Procedures 2 and 10, are not illustrated. Case 1 shows that both the repeater 1 and the repeater 2 are successful in receipt of data; Case 2 shows that the repeater 1 is successful in receipt of data but the repeater 2 is unsuccessful in receipt of data; Case 3 shows that the repeater 1 is unsuccessful in receipt of data but the repeater 2 is successful in receipt of data; and Case 4 shows that both the repeater 1 and the repeater 2 are unsuccessful in receipt of data, as shown in FIG. 5. In the sequence diagram shown in FIG. 5, an arrow depicts a direction of transmission of data; reference symbol R1R1 designates a case where data pertaining to a repeater 1 are transmitted by means of the resource of the repeater 1; and R2R2 designates a case where the data pertaining to the repeater 2 are transmitted by means of the resource of the repeater 2. In FIG. 6, a resource of a repeater of interest is used as an available resource, except where specifically noted.

Embodiment

Preceding Stage

Procedure 1: An eNB allocates resources to the repeaters that perform cooperative relay. The resources are assumed to be sharable between the repeaters that perform cooperative relay.

Procedure 2: Each of the repeaters divides one block of data, which the repeater desires to transmit by means of cooperative relay, into two sub-blocks of data. In the present embodiment, an explanation is given to a case where data are separated into two sub-blocks; namely, first transmission data including systematic bits (denoted as Sx) and transmission data including parity bits (denoted as Px) (reference symbol "x" means a repeater number).

Procedure 3: The repeater 1 transmits its first transmission data S1 (Data 1) to the repeater 2 by use of its own resource.

Procedure 4: The repeater 2 transmits its first transmission data S2 (Data 2) to the repeater 1 by use of its own resource.

Embodiment

Main

The repeater which has successfully exchanged data transmits, at the first frame, first transmission data (Sx) of the party. On the other hand, the repeater which has unsuccessfully exchanged data transmits at the first frame transmission data (Px) including its own parity bits.

(Case 1: Both the Repeater 1 and the Repeater 2 are Successful in Receipt of Data)

Procedure 5: The repeater 2 generates parity bits P1 from the received data S1.

Procedure 6: The repeater 1 generates parity bits P2 from the received data S2.

Procedure 7: The repeater 2 transmits the first transmission data S1 to the eNB by use of its own resource.

Procedure 8: The repeater 1 receives the data transmitted by the repeater 2 in Procedure 7 and determines, from a result of a correlation between its first transmission data S1 and the received data, whether or not exchange of the data performed by the repeater 2 is successful. Specifically, when a high correlation exists, the repeater 1 can determine that the repeater 2 has successfully transmitted the first transmission data S1 and, hence, determines that the repeater 2 has successfully received the first transmission data S1 (exchange of data is successful).

Procedure 9: The repeater 1 transmits the first transmission data S2 to the eNB by use of its own resource.

Procedure 10: The repeater 2 receives the data transmitted by the repeater 1 and determines, from a result of the correlation between its first transmission data S2 and the received data, whether or not exchange of the data performed by the repeater 1 is successful. For instance, when a high correlation exists, the repeater 2 can determine that the repeater 1 has transmitted the first transmission data S2; hence, that the repeater 1 successfully received the first transmission data S2 (exchange of the data is successful).

Subsequently,

Procedure 11: The repeater 2 transmits the generated parity bits P2 to the eNB by use of its own resource.

Procedure 12: The repeater 1 transmits the generated parity bits P1 to the eNB by use of its own resource.

(Case 2: The Repeater 1 is Successful in Receipt of Data, and the Repeater 2 is Unsuccessful in Receipt of Data)

Procedure 5: The repeater 1 generates parity bits P2 from the received data S2.

Procedure 6: The repeater 2 transmits the parity bits P2 to the eNB by use of its own resource.

Procedure 7: The repeater 1 receives the data transmitted by the repeater 2 in Procedure 6 and determines, from a correlation between its first transmission data S1 and the received data, whether or not exchange of the data performed by the repeater 2 is successful. Specifically, when a low correlation exists, the repeater 1 can determine that the repeater 2 has transmitted the parity bits P2; hence, determines that the repeater 2 has unsuccessfully received the first transmission data S1 (exchange of data is unsuccessful) and that the resource of the repeater 2 is available at the next timing.

Procedure 8: The repeater 1 transmits the first transmission data S2 to the eNB by use of its own resource.

Procedure 9: The repeater 2 receives the data transmitted by the repeater 1 in procedure 8 and determines, from a result of correlation between its data and the received data, whether or not the repeater 1 has successfully exchanged data. Specifically, when a high correlation exists, the repeater 2 can determine that the repeater 1 has transmitted the first transmission data S2 and, hence, determines that the repeater 1 has successfully received the first transmission data S2 (exchange of data is successful).

Procedure 10: The repeater 2 which has unsuccessfully exchanged data (has unsuccessfully received the first transmission data S1) opens its own resource to the repeater 1 after transmitted the parity bits P2 to the eNB by use of its own resource (i.e., after Procedure 6).

Subsequently,

Procedure 11: The repeater 1 transmits the parity bits P1 to the eNB by use of the resource of the repeater 2.

Procedure 12: The repeater 1 transmits the first transmission data S1 to the eNB by use of its own resource.

(Case 3: The Repeater 1 is Unsuccessful in Receipt of Data, and the Repeater 2 is Successful in Receipt of Data)

Procedure 5: The repeater 2 generates the parity bits P1 from the received data S1.

Procedure 6: The repeater 2 transmits the first transmission data S1 to the eNB by use of its own resource.

Procedure 7: The repeater 1 receives the data transmitted by the repeater 2 in Procedure 6 and determines, from a correlation between its first transmission data S1 and the received data, whether or not exchange of the data performed by the repeater 2 is successful. Specifically, when a high correlation exists, the repeater 1 can determine that the repeater 2 has transmitted the first transmission data S1; hence, determines that the repeater 2 has successfully received the first transmission data S1 (exchange of data is successful).

Procedure 8: The repeater 1 transmits the parity bits P1 to the eNB by use of its own resource.

Procedure 9: The repeater 2 receives the data transmitted by the repeater 1 in Procedure 8 and determines, from a result of a correlation between its first transmission data S2 and the received data, whether or not exchange of the data performed by the repeater 1 is successful. Specifically, when a low correlation exists, the repeater 2 can determine that the repeater 1 has transmitted the parity bits P1; hence, determines that the repeater 1 has unsuccessfully received the first transmission data S2 (exchange of data is unsuccessful) and that the resource of the repeater 1 is available at the next timing.

Procedure 10: The repeater 1 which has unsuccessfully exchanged data (has unsuccessfully received the first transmission data S2) opens its own resource to the repeater 2 after transmitted the parity bits P1 to the eNB by use of its own resource (i.e., after Procedure 8).

Subsequently,

Procedure 11: The repeater 2 transmits the first transmission data S2 to the eNB by use of its own resource.

Procedure 12: The repeater 2 transmits the parity bits P2 to the eNB by use of the resource of the repeater 1.

(Case 4: Both the Repeater 1 and the Repeater 2 are Unsuccessful in Receipt of Data)

Procedure 5: The repeater 2 transmits the parity bits P2 to the eNB by use of its own resource.

Procedure 6: The repeater 1 receives the data transmitted by the repeater 2 in Procedure 5 and determines, from a correlation between its first transmission data S1 and the received data, whether or not exchange of the data performed by the repeater 2 is successful. Specifically, when a low correlation exists, the repeater 1 can determine that the repeater 2 has transmitted the parity bits P2; hence, determines that the repeater 2 has unsuccessfully received the first transmission data S1 (exchange of data is unsuccessful) and that the resource of the repeater 2 is available at the next timing.

Procedure 7: The repeater 1 transmits the parity bits P1 to the eNB by use of its own resource.

Procedure 8: The repeater 2 receives the data transmitted by the repeater 1 in Procedure 7 and determines, from a result of a correlation between its first transmission data S2 and the received data, whether or not exchange of the data performed by the repeater 1 is successful. Specifically, when a low correlation exists, the repeater 2 can determine that the repeater 1 has transmitted the parity bits P1; hence, determines that the repeater 1 has unsuccessfully received the first transmission data S2 (exchange of data is unsuccessful) and that the resource of the repeater 1 is available at the next timing.

Procedure 9: The repeater 1 which has unsuccessfully exchanged data (has unsuccessfully received the first transmission data S2) opens its own resource to the repeater 2 after transmitted the parity bits P1 to the eNB by use of its own resource (i.e., after Procedure 7).

Procedure 10: Likewise, after transmitted the parity bits P2 to the eNB by use of its own resource (namely, subsequent to Procedure 5), the repeater 2 which has unsuccessfully exchanged data (has unsuccessfully received the first transmission data S1) opens its own resource to the repeater 1.

Subsequently,

Procedure 11: The repeater 2 transmits the first transmission data S2 to the eNB by use of the resource of the repeater 1.

Procedure 12: The repeater 1 transmits the first transmission data S1 to the eNB by use of the resource of the repeater 2.

Embodiment

A Subsequent Stage

Procedure 13: The eNB decodes the received data.

Advantages of the Embodiment

Even when one of the repeaters has become unsuccessful in receipt of data at the time of exchange of data, the eNB can yield a diversity effect by cooperative relay without involvement of occurrence of disproportionateness in received data and can further reduce the number of ACK and NACK signals.

All you have to do is to perform processing for generating the parity bits P1 from the received first transmission data S1 or the parity bits P2 from the received first transmission data S2, at arbitrary timing after receipt of the first transmission data S1 or S2 and before transmission of the parity bits P1 or P2. Further, a sequence of Procedure 3 and Procedure 4, or the like, can also be interchanged.

Further, the data to be divided into two sub-blocks of data are not limited to the systematic bits and the parity bits that are described in connection with the present embodiment. For instance, the essential requirement for a relationship between the blocks of data is that one block of data should become a redundant bit for the other block of data or data can equally be decoded when the blocks of data become equal to each other.

The number of sub-blocks into which data are to be divided is not limited to two. Further, the resource may be a time or a frequency. In the case of a time, transmission timings assigned to respective blocks of data come to be shared. In the case of a frequency, transmission frequencies assigned to respective blocks of data come to be shared.

The present embodiment provides an example in which, when data are unsuccessfully received, transmission data including parity bits are first transmitted. However, the present invention is not limited to the example. For instance, transmission data including systematic bits can also be transmitted in inverse chronological order (in this case, data to be subsequently sent differ from that described in connection with the embodiment).

Figure 7:
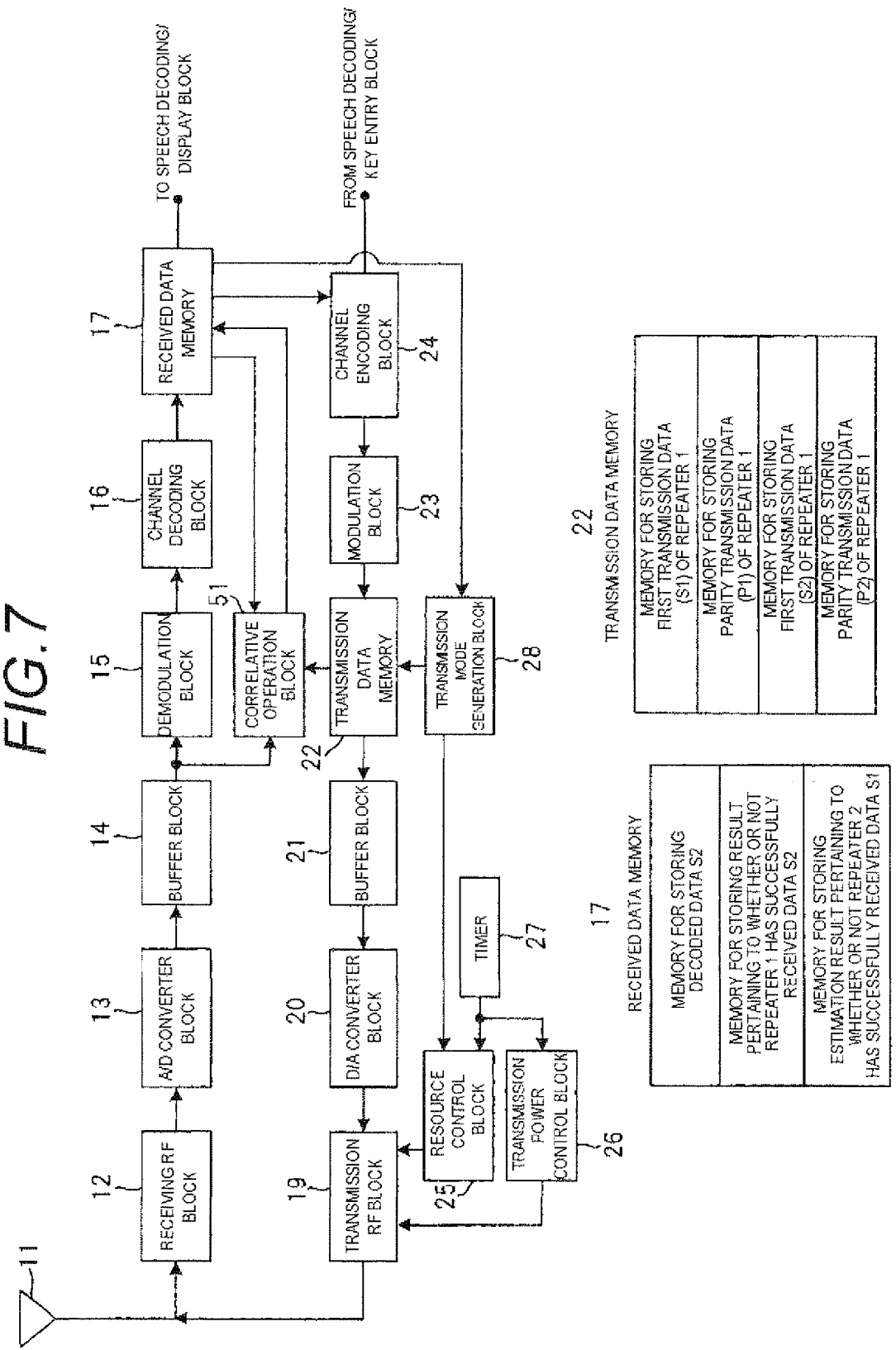
FIG. 7 is a block diagram of a repeater according to the second embodiment of the present invention.

A block diagram of the repeater and that of the base station are now described. FIG. 7 is a block diagram of the repeater. There is now described in detail operation of the repeater 1 performed before transmission of data pertaining to one block is completed by means of cooperative relay.

(Operation of the Repeater 1 for Transmitting First Transmission Data S1 Performed at the Time of Exchange of Data)

The transmission power control block 26 performs control operation so as to weaken transmission power at the time of exchange of data by means of the output from the timer 27. Control information is output to the transmission RF block 19.

First, the repeater 1 divides its transmission data into "first transmission data" and "parity transmission data." The first transmission data are stored in "memory for storing first transmission data (S1) of the repeater 1," and the parity transmission data are stored in "memory for storing parity transmission data (P1) of the repeater 1" of the transmitted data memory 22. The repeater 1 reads the first transmission data from the transmission data memory 22 and stores the data in a buffer block 21. Subsequently, the data are subjected to D/A conversion in the D/A converter block 20. According to control information from the transmission power control block 26, the transmission RF block 19 up-converts the data into a signal of an RF range and transmits the signal from the transmission antenna 11.

<<S2 Receiving Operation of the Repeater 1 Performed at the Time of Exchange of Data>>

Subsequently, the receiving RF block 12 receives the first transmission signal (S2) from the repeater 2 by way of the antenna 11. The receiving RF block 12 converts the received signal to the baseband range through down-conversion, and the thus-converted signal is input to the A/D converter block 13. The signal input to the A/D converter block 13 is converted into a digital signal and subsequently stored in the buffer block 14. The signal stored in the buffer block 14 is demodulated in the demodulation block 15 and further subjected to channel decode processing in the channel decoding block 16. The signal is then held in the "memory for storing decoded data S2" of received data memory 17. A result pertaining to whether or not receipt of the first transmission data S2 is successful (a CRC result, or the like) is stored in "memory for storing a result pertaining to whether or not receipt of the first transmission data S2 performed by the repeater 1 is successful" of the received data memory 17. When receipt of the first transmission data S2 is successful, the decoded data S2 stored in the "memory for storing decoded data S2" of the received data memory 17. The channel encoding block 24 and the modulation block 23 generate, from the decoded data S2, the first transmission data S2 including the systematic bits and transmission data pertaining to the parity bits P2. The first transmission data S2 are held in "memory for storing the first transmission data (S2) of the repeater 2, and the parity transmission data are stored in "memory for storing parity transmission data (P2) of the repeater 2" of the transmitted data memory 22.

<<Operation for Generating a Transmission Mode of the Repeater 1 at the First Frame>>

(1) Operation of the transmission mode generation block 28 is described in connection with a case where the "memory for storing a result pertaining to whether or not receipt of the first transmission data S2 performed by the repeater 1 is successful" in the received data memory 17 shows "successful receipt."

The transmission mode generation block 28 generates, a control signal for transmitting at the first frame, from the "memory for storing first transmission data (S2) of the repeater 2" of the transmission data memory 22, the first transmission data S2 by use of its own resource; and outputs the thus-generated control signal to the transmission data memory 22 and the resource control block 25.

(2) Operation of the transmission mode generation block 28 is described in connection with a case where the "memory for storing a result pertaining to whether or not receipt of the first transmission data S2 performed by the repeater 1 is successful" in the received data memory 17 shows "unsuccessful receipt."

The transmission mode generation block 28 generates a control signal for transmitting at the first frame, from the "memory for storing parity transmission data (P1) of the repeater 1" of the transmission data memory 22, the parity transmission data P1 by use of its own resource and subsequently stopping transmission by use of the resource of the repeater 1 before completion of cooperative relay of transmission data of one block (the resource of the repeater 1 is made available for the repeater 2); and outputs the control signal to the transmission data memory 22 and the resource control block 25.

<<Operation of the Repeater 1 for Transmission to the eNB at the First Frame>>

The transmission power control block 26 performs control operation such that the timer 27 sets transmission power to a normal value during normal transmission operation. The control signal is output to the transmission RF block 19.

According to the control signal generated by the transmission mode generation block 28, the repeater 1 reads the transmission data from the transmission data memory 22 and stores the data in the buffer block 21. Subsequently, the D/A converter block 20 subjects the thus-stored data to D/A conversion, and the transmission RF block 19 up-converts a result of D/A conversion to a signal of an RF range. The thus-converted signal is then transmitted from the transmission antenna 11.

<<Operation of the Repeater 1 for Receiving Transmission Data of the Repeater 2 at the First Frame>>

The receiving RF block 12 receives the first transmission signal addressed to the eNB from the repeater 2. The receiving RF block 12 converts the received signal to the baseband range through down-conversion and inputs the down-converted signal to the A/D converter block 13. The signal input to the A/D converter block 13 is converted into a digital signal, and the digital signal is stored in the buffer block 14. The data stored in the buffer block 14 are output to a correlative operation block 51. The correlative operation block 51 subjects the data stored in the "memory for storing the first transmission data (S1) of the repeater 1" of the transmission data memory 22 and the received data to self-correlation operation. When a high correlation exists, the correlative operation block 51 determines that the repeater 2 has successfully received the first transmission data S1. On the contrary, when a low correlation exists, the correlative operation block determines that the repeater 2 has unsuccessfully received the first transmission data S1. The correlative operation block 51 holds a determination result in "memory for storing an estimation result pertaining to whether or not the repeater 2 has successfully received the first transmission data S1" of the received data memory 17.

<<Operation of the Repeater 1 for Generating a Transmission Mode at the Second Frame>>

(1) There is now described operation of the transmission mode generation block 28 performed when the "memory for storing an estimation result pertaining to whether or not the repeater 2 has successfully received the first transmission data S1" of the received data memory 17 shows "successful receipt" and when the "memory for storing a result pertaining to whether or not the repeater 1 has performed successful receipt" of the received memory 17 shows "successful receipt."

The transmission mode generation block 28 generates a control signal for transmitting, at the second frame, the parity transmission data P1 by use of its own resource from the "memory for storing parity transmission data (P1) of the repeater 1" of the transmission data memory 22; and outputs the control signal to the transmission data memory 22 and the resource control block 25.

(2) There is now described operation of the transmission mode generation block 28 performed when the "memory for storing an estimation result pertaining to whether or not the repeater 2 has successfully received the first transmission data S1" of the received data memory 17 shows "unsuccessful receipt" and when the "memory for storing a result pertaining to whether or not the repeater 1 has performed successful receipt" of the received memory 17 shows "successful receipt."

The transmission mode generation block 28 generates a control signal for transmitting, at the second frame, the parity transmission data P1 from the "memory for storing parity transmission data (P1) of the repeater 1" of the transmission data memory 22 by use of the resource of the party at the other end (the repeater 2) and subsequently transmitting the control signal for transmitting the first transmission data S1 by use of its own resource from the "memory for storing the first transmission data (S1) of the repeater 1." The thus-generated control signal is output to the transmission data memory 22 and the resource control block 25.

(3) There is now described operation of the transmission mode generation block 28 performed when the "memory for storing an estimation result pertaining to whether or not the repeater 2 has successfully received the first transmission data S1" of the received data memory 17 shows "successful receipt" and when the "memory for storing a result pertaining to whether or not the repeater 1 has performed successful receipt" of the received data memory 17 shows "unsuccessful receipt."

The transmission mode generation block 28 generates a control signal for stopping transmission before completion of cooperative relay of the transmission data of one block. The thus-generated control signal is output to the transmission data memory 22 and the resource control block 25.

(4) There is now described operation of the transmission mode generation block 28 performed when the "memory for storing an estimation result pertaining to whether or not the repeater 2 has successfully received the first transmission data S1" of the received data memory 17 shows "unsuccessful receipt" and when the "memory for storing a result pertaining to whether or not the repeater 1 has performed successful receipt" of the received memory 17 shows "unsuccessful receipt."

The transmission mode generation block 28 generates a control signal for transmitting, at the second frame, the first transmission data S1 from the "memory for storing first transmission data (S1) of the repeater 1" of the transmission data memory 22 by use of the resource of the party at the other end (the repeater 2). The thus-generated control signal is output to the transmission data memory and the resource control block 25.

<<Operation of the Repeater 1 for Transmission to the eNB at the Second Frame>>

According to the control signal generated by the transmission mode generation block 28, the repeater 1 reads the transmission data from the transmission data memory 22 and stores the thus-read data in the buffer block 21. The D/A converter block 20 subjects the data to D/A conversion, and the transmission RF block 19 up-converts the data into a signal of RF range, and the signal is transmitted from the transmission antenna 11.

In the embodiment, there is described a case where exchange of data between the repeaters is implemented by use of ordinary radio communication resources. However, exchange of data can likewise be implemented even in a case where a connection is made by means of a wire or infrared communication, or the like.

The block diagram of the base station is now described by reference to FIG. 4. The base station receives a signal by way of the antenna 31 and by means of the receiving RF block 32. The receiving RF block 32 converts the received signal to a baseband range by down-conversion and inputs the signal to the A/D converter block 33. The signal input to the A/D converter block 33 is converted into a digital signal and input to the buffer block 34. When the signal is stored to a predetermined volume of data (i.e., a total volume of data separately transmitted twice from the resource for the repeater 1 and data separately transmitted twice from the resource for the repeater 2) in the buffer block 34, the demodulation block 35 demodulates the data (the first transmission data S1 and the parity data P1) of the repeater 1 and the data (the first transmission data 52 and the parity data P2) of the repeater 2, and the channel decoding block 36 subjects the thus-decoded data to channel decoding.

(Advantage)

Even when one of the repeaters has become unsuccessful in receipt of the data at the time of exchange of data, the eNB can yield a diversity effect by cooperative relay without involvement of disproportionateness in received data. Further, the number of ACK and NACK signals can be reduced.

Third Embodiment

The present embodiment shows an example in which the eNB manages received data (for instance, the data received in Procedures 7 through 10 shown in FIG. 1) by means of resources, to thus decode the received data without performing blind determinations.

Figure 8:
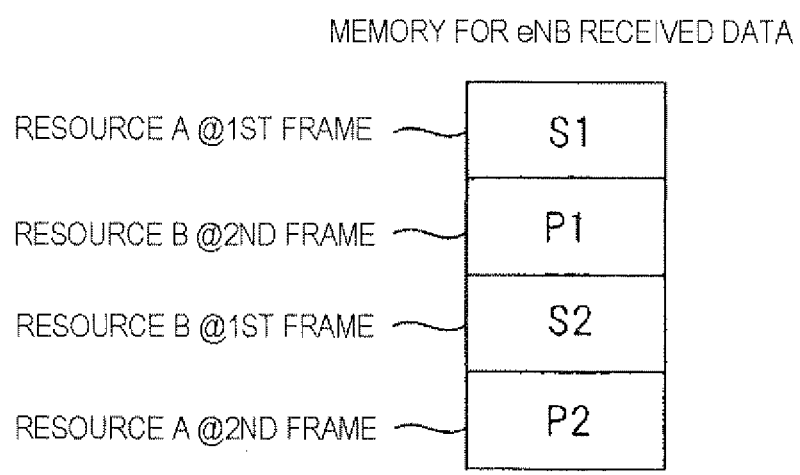
FIG. 8 is a diagram showing example received data memory of an eNB according to a third embodiment of the present invention.
Figure 12:
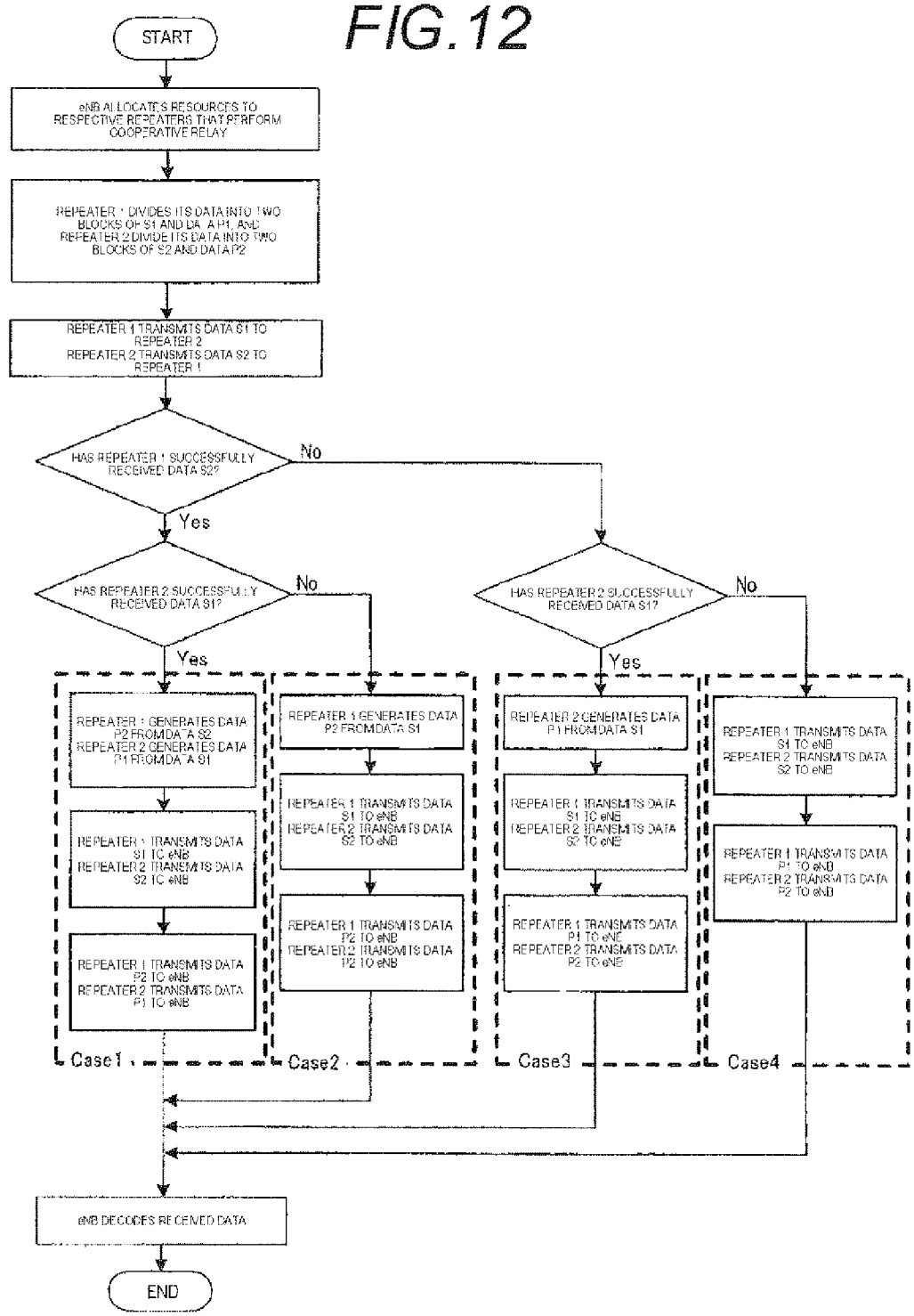
FIG. 12 is a processing flow chart achieved when a repeater that has ended in unsuccessful exchange of data under the related art communication method transmits its own parity bit.
Figure 13:
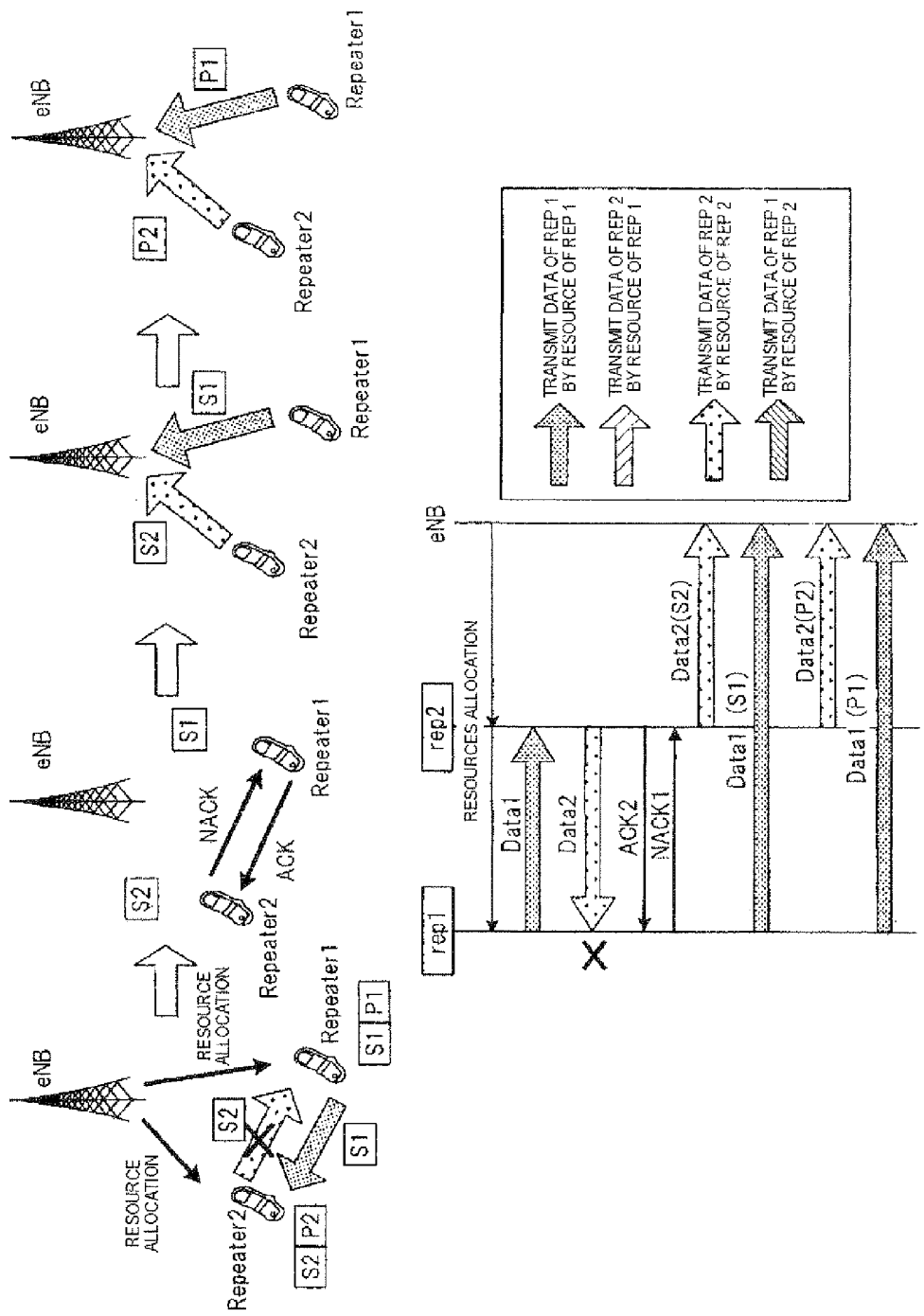
FIG. 13 is a diagram showing example operation performed when an ACK signal showing successful exchange of data and a NACK signal showing unsuccessful exchange of data are introduced into the related art communication method.

FIG. 8 shows example received data memory of the eNB. When the eNB manages received data by means of resources, data are uniquely held in the received data memory as shown in FIG. 8 in any of the cases. Therefore, the eNB can decode the received data without performing a blind determination even when the ACK or the NACK signal is not received from the repeater.

Embodiment

Preceding Stage

Procedure 1: The eNB assigns resources, which can be shared among the repeaters, to the repeaters that perform cooperative relay. In the embodiment, a resource A is allocated to the repeater 1, and a resource B is allocated to the repeater 2.

Embodiment

Main (Case 1: Both the Repeater 1 and the Repeater 2 are Successful in Receipt of Signals)

Procedure 2: The eNB determines, at the first frame, that a signal received from the resource A (from the repeater 1) is the first transmission data S1.

Procedure 3: The eNB determines, at the first frame, that the signal received from the resource B (from the repeater 2) is the first transmission data S2.

Subsequently,

Procedure 4: The eNB determines, at the second frame, that the signal received from the resource A (from the repeater 1) is the parity bits P2.

Procedure 5: The eNB determines, at the second frame, that the signal received from the resource B (from the repeater 2) is the parity bits P1.

(Case 2: the Repeater 1 is Successful in Receipt of a Signal but the Repeater 2 is Unsuccessful in Receipt of a Signal)

Procedure 2: The eNB determines, at the first frame, that a signal received from the resource A (from the repeater 1) is the first transmission data S1.

Procedure 3: The eNB determines, at the first frame, that the signal received from the resource B (from the repeater 2) is the first transmission data S2.

Subsequently,

Procedure 4: The eNB determines, at the second frame, that the signal received from the resource A (from the repeater 1) is the parity bits P2.

Procedure 5: The eNB determines, at the second frame, that the signal received from the resource B (from the repeater 1) is the parity bits (Case 3: the Repeater 1 is Unsuccessful in Receipt of a Signal but the Repeater 2 is Successful in Receipt of a Signal)

Procedure 2: The eNB determines, at the first frame, that a signal received from the resource A (from the repeater 1) is the first transmission data S1.

Procedure 3: The eNB determines, at the first frame, that the signal received from the resource B (from the repeater 2) is the first transmission data S2.

Subsequently,

Procedure 4: The eNB determines, at the second frame, that the signal received from the resource A (from the repeater 2) is the parity bits P2.

Procedure 5: The eNB determines, at the second frame, that the signal received from the resource B (from the repeater 2) is the parity bits P1.

(Case 4: Both the Repeater 1 and the Repeater 2 are Unsuccessful in Receipt of Signals)

Procedure 2: The eNB determines, at the first frame, that a signal received from the resource A (from the repeater 1) is the first transmission data S1.

Procedure 3: The eNB determines, at the first frame, that the signal received from the resource B (from the repeater 2) is the first transmission data S2.

Subsequently,

Procedure 4: The eNB determines, at the second frame, that the signal received from the resource A (from the repeater 2) is the parity bits P2.

Procedure 5: The eNB determines, at the second frame, that the signal received from the resource B (from the repeater 1) is the parity bits P1.

Embodiment

Subsequent Stage

Procedure 6: The eNB decodes the data received from the repeater 1 by use of the resource A at 1st frame (S1) and the resource B at 2nd frame (P1).

Procedure 7: The eNB decodes the data received from the repeater 2 by use of the resource B at 1st frame (S2) and the resource A at 2nd frame (P2).

Advantage of the Embodiment

When the eNB manages the received data by means of the resources and when one of the repeaters has unsuccessfully received data at the time of exchange of data, the resource is opened for the other repeater, whereby the eNB can reduce operation for making a blind determination about the received data.

The respective functional blocks used in description of the respective embodiments are implemented as an LSI that is a typical integrated circuit. The blocks can also be individually packaged into one chip or a chip including some or the entirety of the functional blocks. The integrated circuit is herein described as an LSI but sometimes referred to as an IC, a system LSI, a super LSI, and an ultra LSI according to an integration density.

A technique for implementing the functional blocks in the form of an integrated circuit is not limited to an LSI. The blocks can also be implemented as a custom-designed circuit or a general-purpose processor. There may also be utilized an FPGA (Field Programmable Gate Array) that can be programmed after manufacture of an LSI or a reconfigurable processor that enables reconfiguration of a connection or settings of a circuit cell in an LSI.

Moreover, if a technique for implementing an integrated circuit, which can be a substitution of the LSI, becomes available as a result of advancement of the semiconductor technology or by virtue of other techniques derived from the same, the functional blocks can naturally be integrated by use of the technique. Adaptation of the biotechnology, or the like, is possible.

Although the present invention has been described in detail and by reference to the specific embodiments, it is manifest to the artisans skilled in the art that the invention be susceptible to various alterations or modifications without departing from the spirit and scope of the invention.

The present patent application is based on Japanese Patent Application (P2008-063111) filed on Mar. 12, 2008, the content of which is incorporated herein by reference.

INDUSTRIAL APPLICABILITY

The communication device, the base station, the communication system, and the communication method of the present invention are usable as a communication device, a base station, a communication system, a communication method, and others, that make it possible to yield a diversity effect by cooperative relay without involvement of disproportionateness in data received by the eNB even when one of parties has unsuccessfully exchanged data.

The invention claimed is:

1. A communication device that shares resources allocated by a base station with another communication device, the communication device comprising:
    a transmission block for transmitting first data to the other communication device; and
    a reception block for receiving second data from the other communication device, wherein
    the communication device determines whether or not the communication device has successfully received the second data transmitted from the other communication device and determines whether or not the other communication device has successfully received the first data from the communication device, and
    according to the determination results, the communication device determines data to be transmitted at next transmission timing by the communication device to the base station and determines whether to open the resource originally allocated to the communication device to the other communication device for transmission of data related to the first or second data.

2. The communication device according to claim 1, wherein there are performed dividing data of the communication device into data S1 and data P1, transmitting the data S1 to the other communication device and the base station by use of a first resource, and receiving data S2 transmitted from the other communication device by use of a second resource, and the communication device further includes:
    an ACK/NACK signal generation block that is adapted to generate, according to a result of channel decoding of the data S2, an ACK signal when receipt of the data S2 is successful and generates a NACK signal when receipt of the data S2 is unsuccessful;
    a parity bit generation block that is adapted to generate data P2 from the data S2 when a result of channel decoding of the data S2 shows successful receipt; and
    a transmission mode generation block that is adapted, when the ACK/NACK signal generation block has generated the NACK signal and when the ACK signal is received from the other communication device, to transmit the data S1 by use of the first resource and performs control operation such that transmission of the first resource is not performed, from then on, before completion of cooperative relay of transmission data of one block.

3. The communication device according to claim 1, wherein there are performed dividing data of the communication device into data S1 and data P1, transmitting the data S1 to the other communication device and the base station by use of a first resource, and receiving data S2 transmitted from the other communication device by use of a second resource, and the communication device further includes:

an ACK/NACK signal generation block that is adapted to generate, according to a result of channel decoding of the data S2, data P2 from the data S2 and an ACK signal when receipt of the data S2 is successful and generates a NACK signal when receipt of the data S2 is unsuccessful; and a transmission mode generation block that is adapted, when the ACK/NACK signal generation block has generated the ACK signal and when the NACK signal is received from the other communication device, to transmit the data S1 and the data P2 by use of the first resource and performs control operation such that the data P1 are transmitted by means of the second resource.

4. The communication device according to claim 1, wherein there are performed dividing data of the communication device into data S1 and data P1, transmitting the data S1 to the other communication device and the base station by use of a first resource, and receiving data S2 transmitted from the other communication device by use of a second resource, and the communication device further includes:

an ACK/NACK signal generation block that is adapted to generate, according to a result of channel decoding of the data S2, an ACK signal when receipt of the data is successful and to generate a NACK signal when receipt of the data is unsuccessful; and a transmission mode generation block that is adapted to perform control operation such that, when the ACK/NACK signal generation block generates the NACK signal and when the NACK signal is received from the other communication device, the data S1 are transmitted by means of the first resource and, from then on, the data P1 are transmitted by the second resource.

5. The communication device according to claim 1, wherein there are performed dividing data of the communication device into data S1 and data P1, transmitting the data S1 to the other communication device by means of a first resource, and transmitting the data P1 to the base station, and the communication device further includes:

a correlative operation block which is adapted to subject the data S1 of the communication device and data first transmitted from the other communication device to the base station to self-correlation operation and to determine that the other communication device has successfully received the data S1 when a high correlation exists and that the other communication device has unsuccessfully received the data S1 when a low correlation exits; and a resource control block which is adapted to perform control operation, when the correlative operation block determines that the other communication device has unsuccessfully received the data S1 and that the communication device has successfully received data S2 from the other communication device, such that the data S2 and the data S1 are transmitted to the base station by means of the first resource and that the data P1 are transmitted to the base station by means of the second resource.

6. The communication device according to claim 1, wherein there are performed dividing data of the communication device into data S1 and data P1, transmitting the data S1 to the other communication device by means of a first resource, and transmitting the data P1 to the base station, and the communication device further includes:

a correlative operation block which is adapted to subject the data S1 of the communication device and data first transmitted from the other communication device to the base station to self-correlation operation and to determine that the other communication device has successfully received the data S1 when a high correlation exists and that the other communication device has unsuccessfully received the data S1 when a low correlation exits; and a resource control block which is adapted to perform control operation, when the correlative operation block determines that the other communication device has successfully received the data S1 and that the communication device has unsuccessfully received data S2 from the other communication device, such that the data P1 are transmitted to the base station by means of the first resource and that transmission is stopped from then on before completion of cooperation relay of transmission data of one block.

7. The communication device according to claim 1, wherein there are performed dividing data of the communication device into data S1 and data P1, transmitting the data S1 to the other communication device by means of a first resource, and transmitting the data P1 to the base station, and the communication device further includes:

a correlative operation block which is adapted to subject the data S1 of the communication device and data first transmitted from the other communication device to the base station to self-correlation operation and to determine that the other communication device has successfully received the data S1 when a high correlation exists and that the other communication device has unsuccessfully received the data S1 when a low correlation exits; and a resource control block which is adapted to perform control operation, when the correlative operation block determines that the other communication device has unsuccessfully received the data S1 and that the communication device has also unsuccessfully received data S2 from the other communication device, such that the data S1 are transmitted to the base station by means of a second resource.

8. The communication device according to claim 1, wherein when the communication device determines that the communication device has successfully received the second data from the other communication device and the other communication device has successfully received the first data from the communication device, the communication device generates data related to the second data, and uses the resource allocated to the communication device for transmission of the first data and the data related to the second data.

9. The communication device according to claim 1, wherein when the communication device determines that the communication device has successfully received the second data from the other communication device and the other communication device has failed to receive the first data from the communication device, the communication device generates data related to the first and second data, and uses the resource allocated to the communication device for transmission of the first data and the parity data for the second data and the resource originally allocated to the other communication device for transmission of the parity data for the first data.

10. The communication device according to claim 1, wherein when the communication device determines that the communication device has failed to receive the second data from the other communication device and the other communication device has successfully received the first data from the communication device, the communication device uses the resource allocated to the communication device for transmission of the first data and allows the other communication device to use the resource originally allocated to the communication device for the transmission of the data related to the first and second data.

11. The communication device according to claim 1, wherein when the communication device determines that the communication device has failed to receive the second data from the other communication device and the other communication device has failed to receive the first data from the communication device, the communication device generates data related to the first data and uses the resource allocated to the communication device for transmission of the first data, uses the resource originally allocated to the other communication device for transmission of the data related to the first data and allows the other communication device to use the resource originally allocated to the communication device for the transmission of data related to the second data.

12. The communication device according to claim 1, wherein the data related to the first or second data represents parity data for the first or second data.

* * * * *